United States Patent [19]

Doi et al.

[11] 4,138,694

[45] Feb. 6, 1979

[54] VIDEO SIGNAL RECORDER/REPRODUCER FOR RECORDING AND REPRODUCING PULSE SIGNALS

[75] Inventors: Toshitada Doi, Yokohama; Akira Iga, Tokyo, both of Japan

[73] Assignee: Sony Corporation, Tokyo, Japan

[21] Appl. No.: 771,350

[22] Filed: Feb. 23, 1977

[30] Foreign Application Priority Data

Feb. 24, 1976 [JP] Japan .................................. 51-19198

[51] Int. Cl.$^2$ ............................................. H04N 5/76
[52] U.S. Cl. ...................................... 358/127; 360/8;
179/15.55 T; 365/230; 360/32; 360/36
[58] Field of Search ..................... 360/8, 19, 32, 36, 9,
360/33, 37; 358/127, 138 BH, 143; 179/15.55
T; 365/230, 233, 239

[56] References Cited

U.S. PATENT DOCUMENTS

| 3,789,137 | 1/1974 | Newell | 360/19 |
| 3,860,952 | 1/1975 | Tallent | 358/8 |
| 3,900,887 | 8/1975 | Soga | 360/18 |
| 4,030,129 | 6/1977 | Whitlock | 360/32 |

OTHER PUBLICATIONS

"PCM Recorder" A New Type of Audio Magnetic Tape Recorder; by Sato; J. Audio Eng. Soc; vol. 21, No. 7; Sep. 1973; pp. 542–548.
"Pulse-Code-Modulation Recording System"; by Iwamura et al.; J. Audio Eng. Soc.; vol. 21, No. 7, Sep. 1973; pp. 535–541.

*Primary Examiner*—Terrell W. Fears
*Assistant Examiner*—Alan Faber
*Attorney, Agent, or Firm*—Lewis H. Eslinger; Alvin Sinderbrand

[57] ABSTRACT

A video signal recorder/reproducer is used to record and/or reproduce pulse signals in successive tracks on a record medium. During recording, the pulse signals, which may, as one example, represent audio information, are interleaved with simulated horizontal and vertical synchronizing signals of the type similar to the synchronizing signals which normally are included in a composite video signal. During signal reproduction, the reproduced simulated horizontal and vertical synchronizing signals are detected and used to control the recovery of data from the reproduced pulse signals.

25 Claims, 30 Drawing Figures

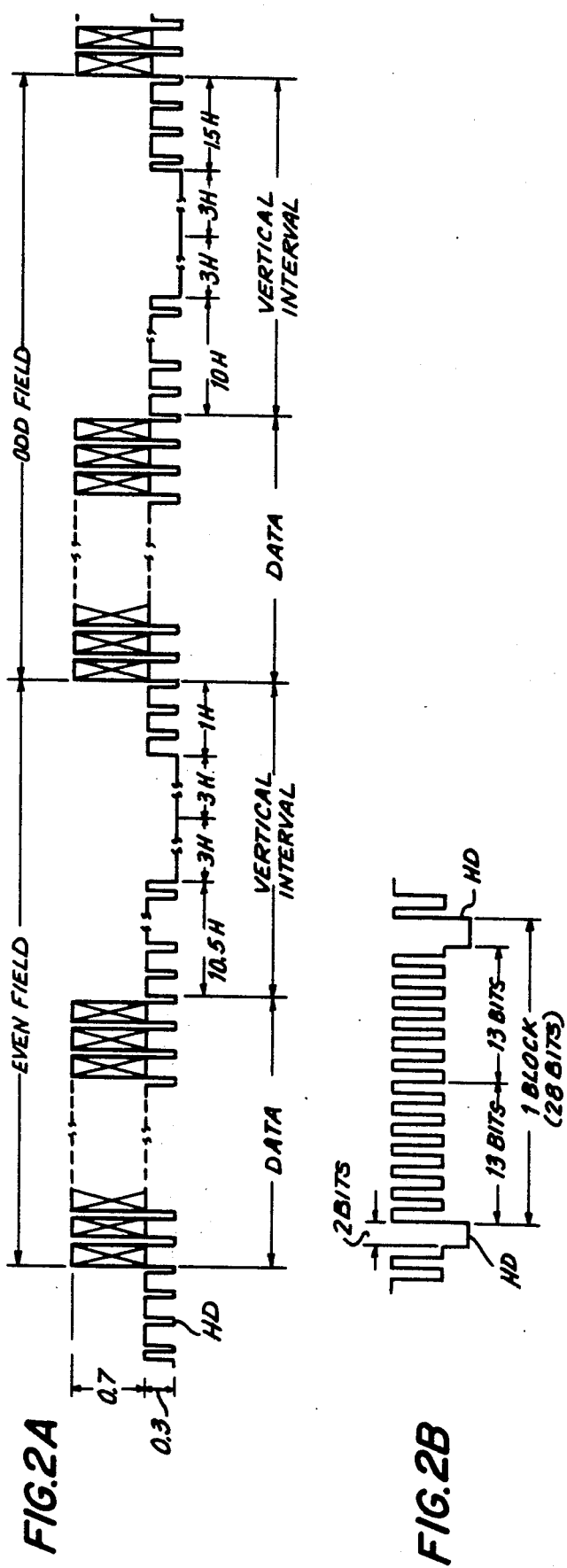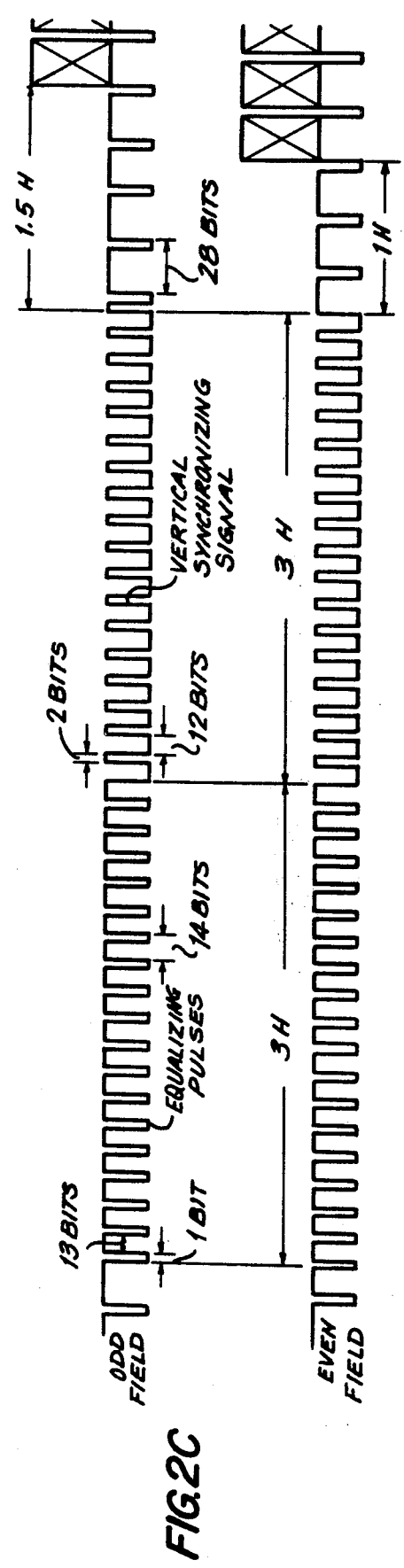
FIG.2A
FIG.2B
FIG.2C

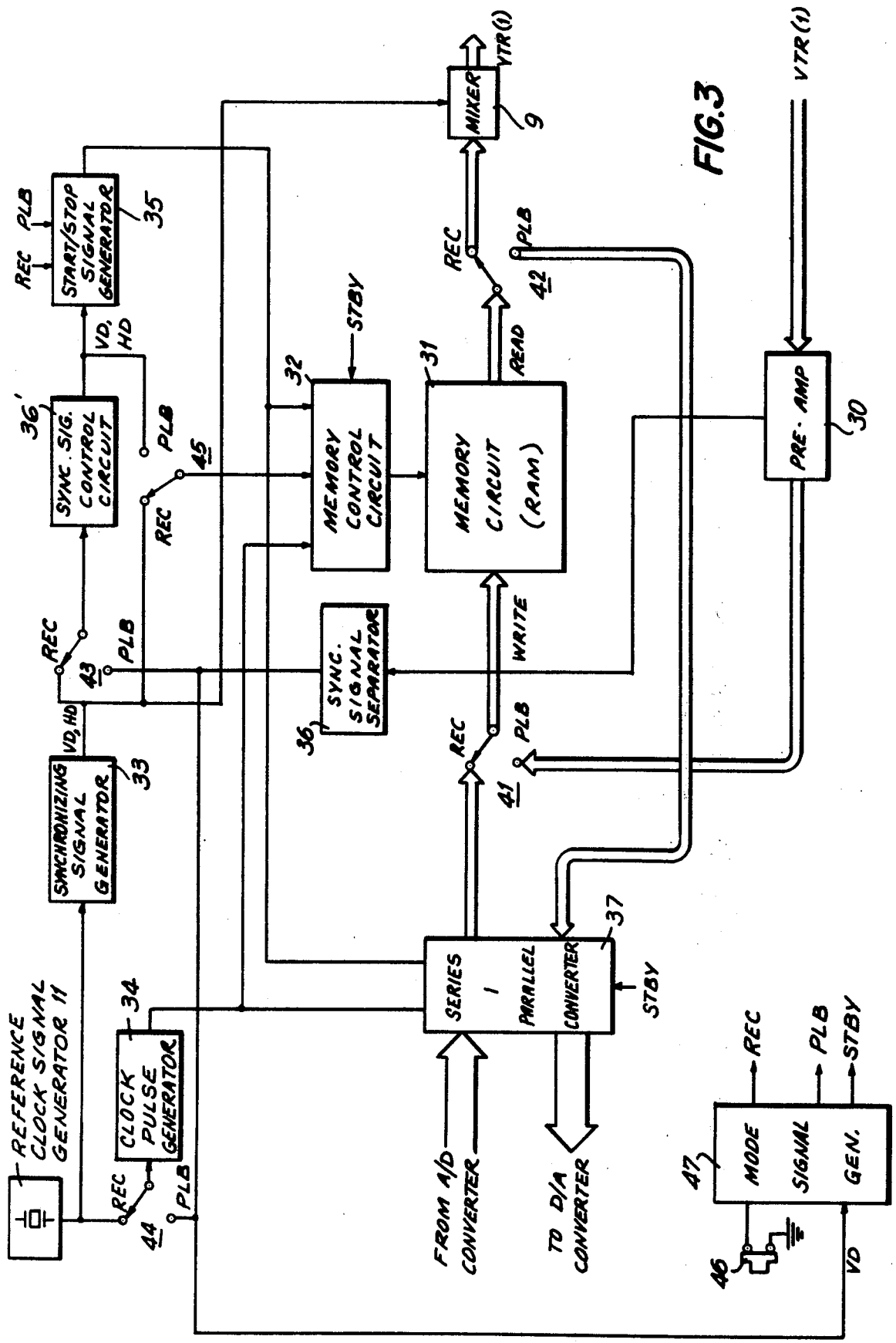

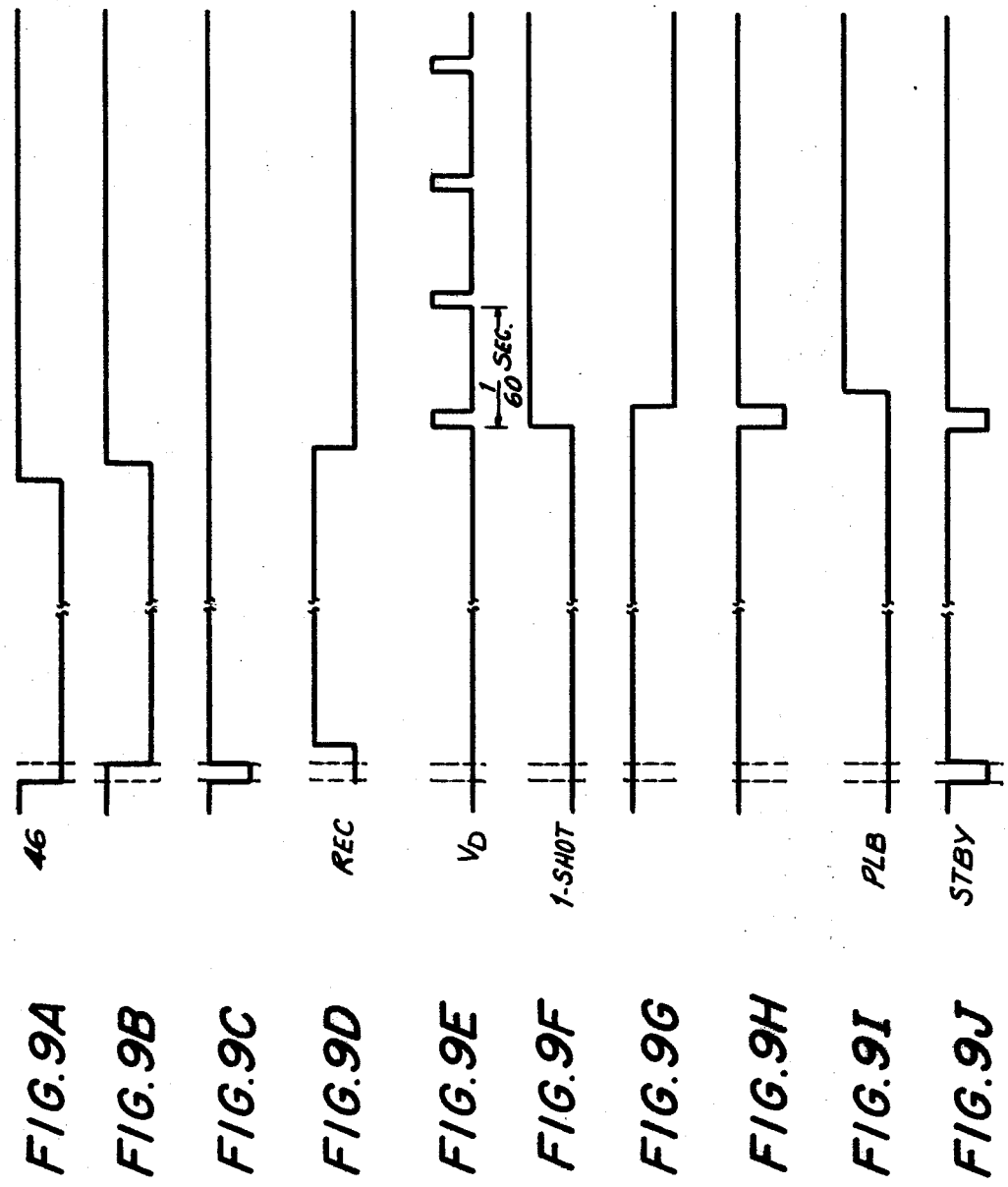

VIDEO SIGNAL RECORDER/REPRODUCER FOR RECORDING AND REPRODUCING PULSE SIGNALS

BACKGROUND OF THE INVENTION

This invention relates to the recording and/or reproduction of pulse encoded information and, more particularly, to a method of and apparatus for using a video signal recorder/reproducer for this purpose.

A magnetic video recorder, such as a video tape recorder (VTR) exhibits a sufficiently wide recording bandwidth such that it can be used to record audio signals with extremely high fidelity. A conventional type of VTR, when used to record an NTSC color video signal, records such a signal in parallel slant tracks, each track having a video field recorded therein. In view of the relatively low frequencies of an audio signal, there is a far greater signal storage capacity in each slant track than is needed for the audio signal. Accordingly, it is not advantageous to record an analog audio signal in place of a video signal in the slant tracks of a VTR.

If an audio signal is encoded into a digital signal, such as a PCM data signal, the resultant pulse signals can be processed without a concomittent loss in signal information. That is, the pulse signals can be transmitted or recorded with great accuracy. However, in order to exhibit the necessary high bandwidth for magnetically recording such pulse signals, suitable magnetic recording equipment heretofore has been very expensive. A VTR of the type now available for home video recording use is far less expensive than professional-type high bandwidth magnetic recording equipment, yet such a VTR offers a satisfactory bandwidth characteristic to permit the magnetic recording of a pulse encoded audio signal.

In order to use a VTR advantageously for recording pulse encoded data in general, or pulse encoded audio information in particular, it is necessary to record control signals which represent, or are similar to, the normal horizontal and vertical synchronizing signals which are included in video signals. This is because the control mechanism of the VTR relies upon these synchronizing signals for the purpose of controlling the movement (e.g., rotation) of the recording/playback head or heads as well as the movement of the recording tape in close synchronism. Accordingly, simulated horizontal and vertical synchronizing signals should be generated and combined with the pulse data so as to supply the VTR with a continuous composite signal for recording which, in some important aspects, is analogous to the video signals normally recorded by such VTR. Furthermore, these simulated synchronizing signals should not interfere with the pulse data. That is, to avoid loss of useful pulse data information, such pulse data should not be replaced by the simulated synchronizing signals.

In accordance with one feature of the apparatus described below, the time domain of the pulse data is compressed for recording, thus leaving "gaps" in the pulse signal into which the desired simulated synchronizing signals can be inserted. During playback, the synchronizing signals are removed and the "gaps" are eliminated by expanding the time domain of the pulse data.

OBJECTS OF THE INVENTION

Therefore, it is one object of the present invention to provide a method of and apparatus for using a video signal recorder for recording pulse encoded information on a record medium.

Another object of this invention is to provide a method of and apparatus for adding simulated horizontal and vertical synchronizing signals to pulse encoded data so as to form a composite signal of the type which can be recorded and/or reproduced by a video signal recorder.

A further object of this invention is to provide a method of and apparatus for using video signal reproducing apparatus for recovering data which had been recorded as pulse signals on a record medium in a particular signal format.

An additional object of this invention is to provide a method of and apparatus for using a video signal recorder/reproducer for recording/reproducing pulse encoded audio signals on a record medium without modifying the video signal recorder/reproducer per se.

Various other objects, advantages and features of the present invention will become readily apparent from the ensuing detailed description, and the novel features will be particularly pointed out in the appended claims.

SUMMARY OF THE INVENTION

In accordance with this invention, a method of and apparatus for controlling a video signal recorder/reproducer of the type normally adapted to record and/or reproduce video signals are provided wherein the video signal recorder/reproducer operates to record and/or reproduce pulse encoded data on a record medium. For a recording operation, pulse encoded data in the form of data words is supplied, and simulated horizontal and vertical synchronizing signals, which are similar to the horizontal and vertical synchronizing signals normally included in a video signal, are generated and combined with the data words so as to form a substantially continuous composite signal. This composite signal is supplied to the video signal recorder for recording in successive tracks on the record medium. In a signal reproduction operation, the recorded composite signal is reproduced and the reproduced simulated horizontal and vertical synchronizing signals are separated therefrom. These separated synchronizing signals are used for the control of data recovery, whereby the original information is recovered from the reproduced data words.

In accordance with one advantageous feature of this invention, the pulse encoded information is representative of analog audio signals. As another advantageous feature of this invention, the simulated horizontal and vertical synchronizing signals are combined with the data words in such manner as not to destroy or deleteriously affect any of the data information.

BRIEF DESCRIPTION OF THE DRAWINGS

The following detailed description, given by way of example, will best be understood in conjunction with the accompanying drawings wherein:

FIGS. 2A–2C are waveform diagrams representing how the system of FIG. 1 operates;

FIG. 3 is a block diagram showing a portion of the system of FIG. 1 in greater detail;

FIGS. 9A-9J are waveform diagrams which are useful in explaining the operation of the mode signal generator.

DETAILED DESCRIPTION OF A PREFERRED EMBODIMENT

Overall System

Figure 1:
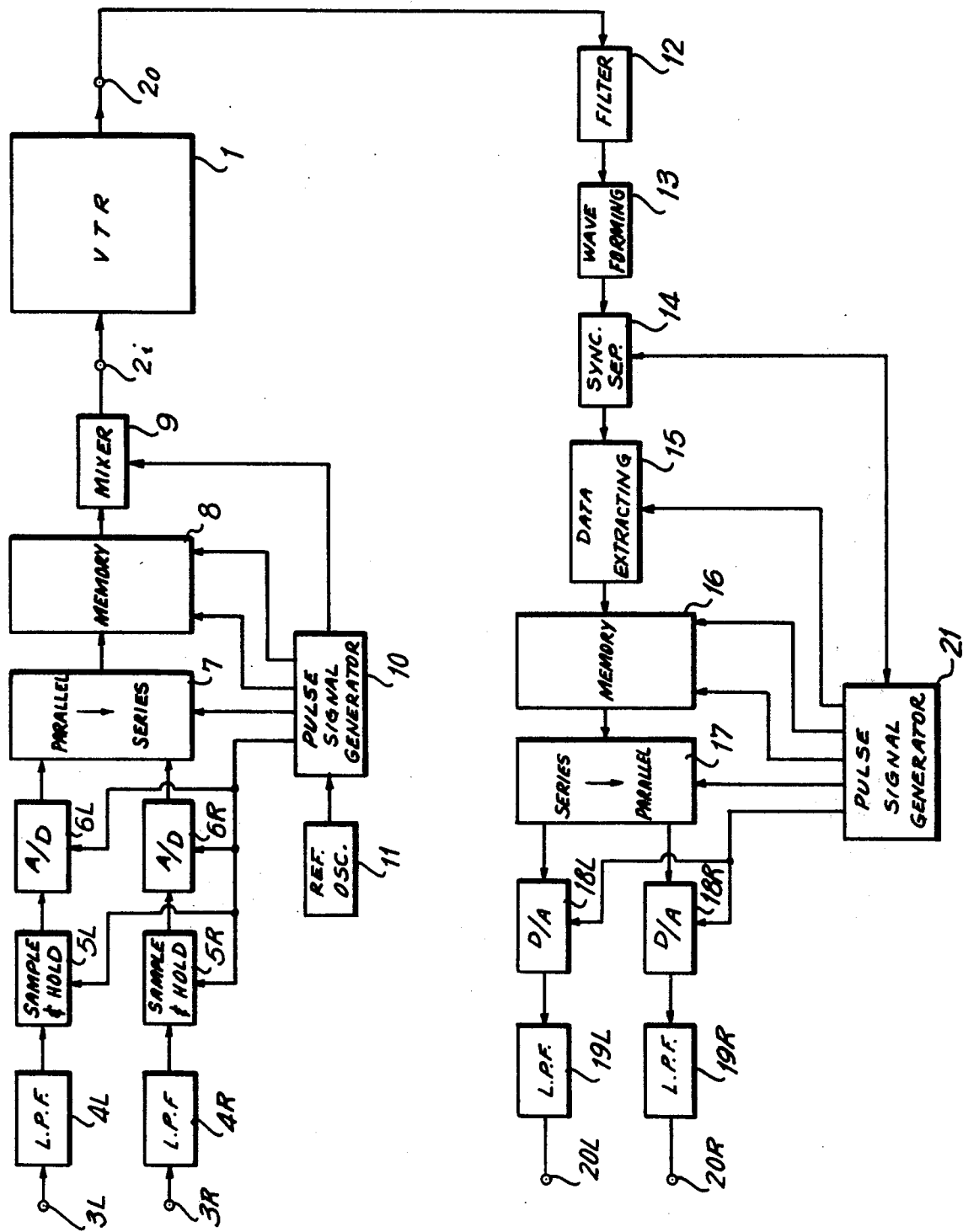
FIG. 1 is an overall system block diagram of the present invention.

Referring now to the drawings, and in particular to FIG. 1, there is illustrated a block diagram of one embodiment of apparatus which can be used in conjunction with a video signal recorder to record signals, and particularly pulse signals, onto a record medium and to reproduce such signals from the record medium. For the purpose of the present description, the video signal recorder is assumed to be a video tape recorder (VTR) 1 and the record medium is assumed to be magnetic tape. However, it will be apparent that other types of recorders and recording media can be used, such as an optical recorder, a magnetic sheet, disc, or the like. As is known, VTR 1 is adapted for normal operation to record and play back video signals. For this purpose, VTR 1 includes circuitry that utilizes the synchronizing signals normally accompanying a video signal to particularly control a recording and a playback operation. As one example, VTR 1 is of the type having two rotary heads spaced 180° apart that scan successive slant tracks across magnetic tape, each such track having one field of an NTSC signal recorded therein. Such a VTR has a bandwidth that is sufficiently wide so as to be capable of recording pulse signals in the slant tracks. Since, in the conventional VTR, each rotary head records and reproduces a serial signal, these heads can be used to record and reproduce pulse signals in serial form. While these pulse signals can, of course, represent a wide variety of data, or information, the system shown in FIG. 1 will be described for the application wherein analog audio signals are represented by pulse signals. This can be achieved by sampling audio signals, for example, left and right stereo signals, and suitably encoding each sample, as by pulse code modulation (PCM) encoding.

In order to understand better the following description and appreciate the improvements achieved by the system of FIG. 1, an explanation of preferred parameters now is given. Practically, VTR 1 is capable of recording 1,400,000 bits per second (1.4M bit/sec.), thus having a pulse signal recording rate corresponding to 1.4 MHz. If the audio signal is to be enabled to undergo a dynamic range of 90dB for high fidelity recording, a sampled signal should be encoded with 13 bits. Hence, if left and right stereo signals are contemplated, then each digital word is comprised of 26 bits (13 bits per channel). Now, in a conventional VTR, it is convenient for the frequency of the signal that is recorded to be related to the horizontal synchronizing signal frequency $f_h$ so that the digital word recording signal frequency $f_t = nf_h$, where n is an integer; but $$f_t < \frac{1.4 \times 10^6}{26}$$

or $f_t$ should be less than 53.85 KHz. Also, each slant track has one field of a video signal recorded therein, and each field is comprised of 262.5 horizontal line intervals. However, useful information, that is, pulse encoded audio information, is not recorded during the vertical synchronizing interval which, generally, is comprised of about twenty horizontal line intervals (20H).

If it assumed that the maximum frequency in the audio signal to be recorded is approximately 20 KHz, then the minimum sampling frequency $f_s$ necessary to encode this audio signal is twice the maximum frequency, or 40 KHz. Therefore, the minimum digital word recording signal frequency should be greater than the ratio between the number of horizontal line intervals in a field and the number of useful horizontal line intervals in that field, times the minimum sampling frequency, that is, $$f_t > \frac{262.5}{262.5 - 20} \times 40 \times 10^3$$

or $f_t > 43.3$ KHz. The following summary of the foregoing conditions $43.3$ KHz $< (f_t = nf_h) < 53.85$ KHz is satisfied by:

$$f_t = 3f_h = 3 \times 15.75 \text{ KHz} = 47.25 \text{ KHz}.$$

Consistent with this expression, the sampling frequency $f_s$ may be expressed as $$f_s = \frac{262.5 - 20}{262.5} \times f_t = 43.65 \text{ KHz}.$$

However, the sampling frequency $f_s$ should be related to the recording signal frequency $f_t$ by an integral number. If $f_t/f_s = 15/14$, as an example, then $f_s = 44.1$ KHz. Thus, the number of samples N recorded in each field is equal to the sampling frequency $f_s$ divided by the duration of a field, $$N = \frac{44.1 \times 10^3}{60} = 735.$$

As mentioned above, each sample is formed of a 26-bit word with 13 bits representing the left-channel audio signal and 13 bits representing the right-channel audio signal of a stereo signal. Also, three words (or three left and right channel samples) are provided during each horizontal line interval. Hence, the number of horizontal line intervals during each field that are occupied by pulse encoded audio signals is equal to 735/3, or 245 line intervals. Thus, the vertical blanking interval in each field should be $262.5 - 245 = 17.5H$, or 17.5 horizontal line intervals.

The apparatus of FIG. 1 operates with the foregoing parameters to record pulse encoded audio signals on a magnetic medium and to reproduce such signals therefrom. As shown, the system includes a recording channel comprised of a low-pass filter 4L, a sampling circuit 5L, an analog-to-digital (A/D) converter 6L and a parallel-to-serial converter 7 for the left channel and a low-pass filter 4R, a sampling circuit 5R, an analog-to-digital (A/D) converter 6R and parallel-to-serial converter 7 for the right channel. The system also includes a reproducing channel comprised of a serial-to-parallel converter 17, digital-to-analog (D/A) converter 18L and low-pass filter 19L for the left channel and serial-to-parallel converter 17, a digital-to-analog (D/A) converter 18R and a low-pass filter 19R for the right channel. As may be appreciated, the recording channel is adapted to supply the pulse encoded audio signals (hereinafter, pulse signals) to VTR 1 for recording, while the reproducing channel is adapted to supply the pulse signals reproduced by VTR 1 to suitable sound reproduction devices (not shown). To accommodate the different sampling and recording frequencies $f_s$ and $f_t$, respectively, and furthermore, to permit the pulse signals to be combined with simulated horizontal and vertical synchronizing pulses (to be described) without loss of pulse data, a memory device 8 is provided between the recording channel and the VTR, while a memory device 16 is provided between the VTR and the reproducing channel. In a practical embodiment, both memory devices are combined into a single addressable memory, such as a random access memory (RAM) that is used selectively during a recording or reproducing operation.

Low-pass filter 4L is coupled to an audio input terminal 3L to receive the left-channel audio signal and to supply this audio signal to sampling circuit 5L. As one example, the sampling circuit coded representation, for example, a parallel 13-bit signal, of the analog sample. These parallel bits are supplied to parallel-to-serial converter 7 for serialization. Similarly, the right-channel audio signal is received by an audio input terminal 3R, and low-pass filter 4R, sampling circuit 5R and A/D converter 6R function to supply a 13-bit pulse encoded representation of the right-channel audio signal sample to parallel-to-serial converter 7. Although not shown in detail, it is apparent that the parallel-to-serial converter is controlled by clock pulses applied thereto by pulse generator 10 for producing the 13 serialized bits of one channel, for example, the left channel, followed by the 13 serialized bits of the other channel.

The pulses produced by parallel-to-serial converter 7 are supplied to memory 8 to be written into addressed locations therein in response to write pulses derived from pulse generator 10. In a preferred embodiment described below, the memory is a RAM and each pulse is stored in a separately addressed location. Thus, the block designated "memory" also includes suitable control circuitry.

Since the sampling rate $f_s$ is less than the signal recording frequency $f_t$, memory 8 functions to vary the time domain of the pulse signals so as to adapt the pulse signals for recording. That is, these pulse signals are subjected to a time-compression operation. To this effect, the pulse signals previously stored in memory 8 are read out from their addressable locations in response to read pulses derived from pulse generator 10, and then supplied through a mixer circuit 9 to VTR 1. The purpose of the mixer circuit is to add the simulated video synchronizing signals to the pulse signals read out of memory 8, thereby enabling VTR 1 to be controlled in its operation in the usual manner, which is known to the television art and need not be explained herein.

Pulse generator 10 is a timing circuit to which reference clock pulses, such as produced by reference oscillator 11, are supplied, these reference clock pulses being used to generate the aforementioned sampling pulses, converter control pulses, memory write and read pulses, and video synchronizing pulses.

The format in which the pulse encoded audio signals are recorded by VTR 1 is shown in FIG. 2A. One complete frame is shown as being comprised of an even field followed by an odd field, the fields being separated by the vertical blanking interval, as is conventional for a video signal. This vertical blanking interval usually includes 10 or 10.5 horizontal line intervals which are provided with no video information, then a period of equalizing pulses occupying 3 horizontal line intervals, then a period of vertical synchronizing pulses occupying another 3 line intervals, followed by another period of equalizing pulses and 1.5 or 1 line intervals which are provided with no video information. Thus, a conventional video signal has a vertical blanking interval of 20 horizontal line intervals. The duration defined by the first 10 or 10.5 line intervals in the vertical blanking interval is used by VTR 1 for head switch-over; that is, switching from one rotary head to the other. Usually, the second set of equalizing pulses is used to define the video retrace interval. However, when VTR 1 is used to record audio information, this second set of equalizing pulses is not necessary. Hence, the vertical blanking interval can be shortened by three line intervals, thus extending the time during which useful information (i.e., audio information) can be recorded.

Therefore, as shown in FIG. 2A, the pulse encoded audio signals are recorded in an "even" field in a slant track by VTR 1, followed by a vertical blanking interval formed of 10.5 line intervals followed by 3 line intervals of equalizing pulses and 3 line intervals of vertical synchronizing pulses and then 1 line interval. Succedding this vertical blanking interval is the "odd" field of pulse encoded audio signals, followed by a vertical blanking interval formed of 10 line intervals, then 3 line intervals of equalizing pulses, 3 line intervals of vertical synchronizing pulses and then 1.5 line intervals. In both the "even" and "odd" fields, the pulse signals are recorded as 735 successive words, each word being formed of 26 bits to represent the left and right channel samples, and 3 words being provided during each horizontal line interval. While these words are recorded similarly in each field, the "even" field of pulse data follows the vertical synchronizing pulses by 1.5 line intervals, while the "odd" field of pulse data follows the vertical synchronizing pulses by 1 line interval.

As shown in greater detail in FIG. 2B, successive words are separated by simulated synchronizing pulses $H_D$. These synchronizing pulses resemble horizontal synchronizing pulses, but are of three times the horizontal synchronizing frequency $f_h$. Synchronizing pulses $H_D$ are of a duration equal to two data bits and are of a period that is one-third the line interval. The synchronizing pulses are produced by pulse generator 10 as aforesaid, and are less than the pulse amplitude of the pulse encoded audio information. In one example the ratio of synchronizing pulse level $H_D$ to data pulse level is 3:7, with the synchronizing pulses being negative. These synchronizing pulses can be inserted into "gaps" between successive words, which gaps can be provided by parallel-to-serial converter 7, or by the read-out operation of memory 8, as will be described below, and which coincide with the synchronizing pulses produced by pulse generator 10. For the purpose of simplification, the pulse data shown in FIG. 2B is assumed to be formed of alternating 1's and 0's.

In a conventional video signal, the equalizing pulses are negative and are twice the frequency of the horizontal synchronizing pulses. The vertical synchronizing pulses also are twice the frequency of the horizontal synchronizing pulses, but are positive. Consistent with this video signal format, the equalizing pulses here recorded on VTR 1 are negative and are twice the frequency of the synchronizing pulses $H_D$; while the vertical synchronizing pulses are positive and are twice the frequency of synchronizing pulses $H_D$, as shown in FIG. 2C. The width of each equalizing pulse is equal to 1-bit width, and the width of each vertical synchronizing pulse is equal to 2-bit widths.

The signal format of the pulse encoded audio signals, as shown in FIGS. 2A–2C, is very similar to that of a conventional video signal and, therefore, readily can be recorded by VTR 1. That is, the VTR includes servo control apparatus which is responsive to the vertical synchronizing signal for controlling the rotation of the magnetic heads and the movement of tape and time-base error correcting circuitry which is responsive to the horizontal synchronizing signal to correct for time-base error during signal playback. This apparatus and circuitry likewise respond to the vertical synchronizing signals and synchronizing pulses $H_D$ which are provided with the pulse encoded audio signals, as shown in FIGS. 2A–2C.

In view of the foregoing, if the pulse signals were recorded at the same rate at which they are produced, the fact that the audio signal is continuous means that there would not be any available interval to insert the aforementioned vertical synchronizing signal. Rather, a portion of the audio information would have to be replaced by the vertical synchronizing signal, thus degrading the quality of the audio information which is reproduced. However, since time compression of the pulse signals is achieved by the operation of memory 8, a suitable interval is provided within which the vertical synchronizing signal can be inserted without impairing the audio information.

Returning to FIG. 1, after the aforedescribed pulse-encoded audio signal is recorded by VTR 1, it may be reproduced subsequently. For this purpose, the reproducing channel is shown connected to an output terminal $2_0$ of the VTR. This reproducing channel may be in combination with the illustrated recording channel, or it may form separate apparatus. In addition to memory 16, serial-to-parallel converter 17, D/A converters 18 and low-pass filters 19, described above, the reproducing channel also includes a filter 12 coupled to VTR output $2_0$ for removing noise components in the reproduced pulse signals, a wave shaping circuit 13 coupled to filter 12 for reshaping the pulse signals, a synchronizing signal separator circuit 14 coupled to wave shaping circuit 13 for separating the synchronizing signals from the reproduced pulse signals, and a data extracting circuit 15 coupled to separator circuit 14 for passing, or transmitting, the data pulses to memory 16. A pulse generator 21 is coupled to separator circuit 14 for sensing the synchronizing signals and for generating various timing signals in response thereto. As illustrated, these timing pulses are applied to data extracting circuit 15, memory 16, serial-to-parallel converter 17 and D/A converter 18.

In operation, VTR 1 reproduces the pulse signals recorded in the slant tracks, as shown in FIGS. 2A–2C, at the same rate as the signal recording rate. Synchronizing signal separator circuit 14 and data extracting circuit 15 remove synchronizing pulses $H_D$ and those pulses in the vertical blanking interval occupying the 17.5 horizontal line intervals, illustrated in FIGS. 2A and 2C. The resultant pulse data signal thus includes a gap between fields of useful pulse signals. Memory 16 writes these pulse signals into addressable locations therein at the pulse playback rate, and reads them out at the original sampling rate as determined by timing pulses applied by pulse generator 21. Hence, time expansion of the reproduced pulse signals is achieved, effectively "stretching" the duration of each data word to be the same as that produced originally by parallel-to-serial converter 7.

The time-expanded serialized pulse signals read out of memory 16 are converted to parallel form by serial-to-parallel converter 17, and the left channel (13-bit) encoded audio signal is converted to analog form by D/A converter 18L while the right channel (13-bit) encoded audio signal is converted to analog form by D/A converter 18R. After filtering in low-pass filters 19L and 19R, the left channel audio signal is provided at output terminal 20L and the right channel audio signal is provided at output terminal 20R.

Memory 16 is controlled by timing pulses generated by pulse generator 21 which are derived from the reproduced synchronizing signals, including synchronizing pulses $H_D$. Accordingly, if there is any time-base error in the reproduced signals, such as jitter, this time-base error is accounted for when the pulse signals are written into the memory. Such time-base error therefore is substantially removed.

Hence, a conventional video signal recorder, such as VTR 1, can be used to record and reproduce audio signals with high fidelity, without requiring any structural change or modification in the recorder itself.

RECORD/PLAYBACK CONTROL

Referring now to FIG. 3, a portion of the overall system shown in FIG. 1 is illustrated in greater detail. The illustrated circuitry is used to control memory device 8 (16) for pulse recording and reproducing operations by VTR 1, the memory device here being identified by reference numeral 31 from which pulse data is supplied to VTR 1 through mixer 9 and to which pulse data is supplied by the VTR through a preamplifier 30. Also illustrated is a parallel-serial/serial-parallel converter 37 which is a practical embodiment of parallel-to-serial converter 7 capable of serializing pulse data during a recording operation, and also of serial-to-parallel converter 17 for converting a serial pulse train into parallel form during a reproducing operation. Thus, pulse encoded audio information produced by A/D converters 6R and 6L is serialized by converter 37 and then supplied to memory 31 wherein its time axis is compressed before being supplied through mixer 9 to VTR 1 for recording. As one example, the 26-bit parallel data word (FIG. 2B) supplied to converter 37 by A/D converter 6R and 6L may be serialized into 28 bits, thus adding the aforenoted 2-bit "gap" into which the synchronized pulses $H_D$ can be inserted in mixer 9. During signal playback, the pulse data reproduced by VTR 1 is supplied through preamplifier 30 to memory 31, wherein the time axis thereof is expanded, and then reconverted to parallel form by converter 37 before being transformed into an analog audio signal by D/A converters 18L and 18R. This data signal path is represented by the double lines shown in FIG. 3.

Control over memory 31 and the data signal path is achieved by appropriate control signals transmitted along control signal paths represented by the single line in FIG. 3. Although single lines are shown, in some instances, a single line represents plural conductors. The control circuitry is formed of reference oscillator 11, synchronizing signal generator 33, clock pulse generator 34, START/STOP signal generator 35, synchronizing signal separator 36, sync signal control circuit 36', mode signal generator 47 and memory control circuit 32. Also shown are various record/playback selector switches 41 through 45, adapted for simultaneous automatic operation between a record (REC) condition and a playback (PLB) condition, and a record selecting pushbutton switch 46. Reference oscillator 11 is adapted to produce reference clock pulses of a relatively high frequency, these clock pulses being supplied to synchronizing signal generator 33 and through switch 44 in its REC condition to clock pulse generator 34. The synchronizing signal generator functions to generate synchronizing pulses $H_D$ (FIGS. 2A-2C) and also the various pulses shown during the vertical blanking interval (FIGS. 2A and 2C), hereinafter designated the vertical sync signal $V_D$, which is a simulated vertical synchronizing signal. Synchronizing signal generator may be comprised of conventional counting and gating circuits arranged in circuit to generate pulses $H_D$ and vertical sync signal $V_D$.

Clock pulse generator 34 is formed of frequency-dividing, timing and gating circuitry and is adapted to produce various timing signals which are supplied to converter 37 and to memory control circuit 32. When switch 44 is in its REC condition, clock pulse generator 34 responds to the reference clock pulses generated by reference oscillator 11 to produce the timing signals by which converter 37 converts parallel pulses to serial pulses and to produce memory timing pulses which are used by memory control circuit 32 to control the writing-in and reading-out of data with respect to memory 31. When switch 44 is in its PLB condition, clock pulse generator 34 is responsive to synchronizing signals $H_D$, which are reproduced by VTR 1 from previously recorded magnetic tape, for producing the timing pulses. Hence, during a reproducing operation, memory 31 and converter 37 are synchronized with any time-base error that may be present, thereby to correct for jitter or other signal distortion caused by, for example, tape fluctuation, tape shrinkage, stretching, etc.

Vertical sync signal $V_D$ and synchronizing signal $H_D$ produced by synchronizing signal generator 33 are supplied to sync signal control circuit 36' by switch 43 when the latter is in its REC condition. These signals also are supplied to mixer 9 for combining with the pulse data read out of memory 31 so as to form the composite signal shown in FIG. 2A for recording. Sync signal control circuit 36' is adapted to selectively delay the vertical sync signal $V_D$ so as to selectively extend the duration of the vertical blanking interval during each odd field. That is, the sync signal control circuit selectively determines whether data pulses will follow the vertical synchronizing pulses by one synchronizing pulse period ($H_D$) or by 1.5 synchronizing pulse periods for a purpose described in greater detail below. Sync signal control circuit 36' may comprise a selectively energized, or gated, delay circuit, such as a monostable multivibrator. The delayed, or extended, vertical sync signal is designated $V'_D$, and this, together with the non-delayed vertical sync signal $V_D$ and synchronizing pulses $H_D$ generated by synchronizing signal generator 33 are supplied to START/STOP signal generator 35 when switch 43 is in its REC condition.

The START/STOP signal generator is adapted to produce gating signals, for example, START signals, at appropriate times and of suitable duration in response to synchronizing pulses $H_D$ and vertical sync signal $V_D$ such that pulse data can be written into and read out of memory 31. During a recording operation, the START signal produced by START/STOP signal generator 35 for reading pulse data out of memory 31 is of a duration corresponding to the time needed to transmit 735 words to VTR 1 between vertical blanking intervals; and, similarly, during a reproducing operation, the START signal for writing pulse data into memory 31 from VTR 1 also corresponds to this duration. The START signal produced by the START/STOP signal generator for writing pulse data into memory 31 during recording and for reading pulse data out of this memory during reproducing is substantially continuous, except that the recording write pulse START signal commences at the start of the next field interval following initiation of the recording operation, and the reproducing read pulse START signal is delayed by an amount sufficient to permit some number of words to be written into the memory following initiation of the reproducing operation. When a START signal is not produced by START/STOP signal generator 35, a STOP signal is produced to inhibit data from being written into and read out of memory 31. Accordingly, the START/STOP signal generator is comprised of pulse counting, gating and delay circuitry which is responsive to the synchronizing pulses $H_D$ and vertical sync signal $V_D$, as well as to record control signal REC and reproducing (or playback) control signal PLB which are supplied thereto by mode signal generator 47, to be described. The START and STOP signals are supplied to memory control circuit 32 and to converter 37 for selectively enabling or inhibiting the operation of these circuits.

Memory control circuit 32 is described in greater detail below with respect to FIG. 4. If it is assumed that memory 31 is addressable, such as a RAM, then the memory control circuit includes addressing circuits for generating write-in and read-out addresses for the memory so that pulse data can be written into and read out of memory 31, respectively, thereby changing the time-axis thereof (time-domain compression and expansion). The write-in and read-out operations are performed substantially independently of each other, but at different rates. To avoid the possibility of an erroneous write-in or read-out operation which could occur in the event that these operations are performed at the same instant of time, memory control circuit 32 includes priority determining circuitry to award priority to one operation while delaying the performance of the other. The memory control circuit is shown coupled to memory 31 to supply the suitable addresses and read/write control pulses to the memory so that pulse data can be stored and withdrawn therefrom. As will be further described in connection with FIG. 4, memory 31 may include input and output circuitry through which the pulse data is written in and read out.

Synchronizing signal separator circuit 36 is coupled to preamplifier 30 and is adapted to detect the synchronizing pulses $H_D$ and vertical sync signal $V_D$ that are included in the pulse signals reproduced by VTR 1. The synchronizing signal separating circuit may be of a type conventionally used in video (e.g. television) signal applications, such as formed of gating and timing circuits. Synchronizing pulses $H_D$ are supplied by synchronizing signal separator circuit 36 to clock pulse generator 34 via switch 44 in its PLB condition so that the clock pulse generator can provide suitable timing pulses to converter 37 for a serial-to-parallel data conversion, and suitable timing pulses to memory control circuit 32 for storing pulses and withdrawing pulses from memory 31, during a reproducing operation. Also, when switch 43 is in its PLB condition, the synchronizing pulses $H_D$ and vertical sync signal $V_D$ recovered by synchronizing signal separator circuit 36 are supplied to START/STOP signal generator 35 in place of the synchronizing pulses and vertical sync signal that are produced by synchronizing signal generator 33, described above.

Vertical sync signal $V_D$ produced by synchronizing signal separator circuit 36 also is applied to mode signal generator 47. The mode signal generator is responsive to the operation of record selecting pushbutton switch 46 to generate a record enable control signal REC or a playback enable control signal PLB, as aforesaid, and also to generate a standby signal STBY immediately following the actuation of switch 46 but prior to the occurrence of the REC and PLB signals, respectively. The PLB and STBY signals are synchronized with vertical sync signals $V_D$ produced by synchronizing signal separator circuit 36 so that memory control circuit 32, START/STOP signal generator 35 and converter 37, which are supplied with selected ones of the PLB and STBY signals, are correspondingly synchronized with the signals reproduced by VTR 1. Standby signal STBY serves to reset memory control circuit 32 and converter 37 to an initial, or reference, condition so as to avoid an improper write-in or read-out operation of memory 31. Playback control signal PLB is produced when switch 46 is open and record control signal REC is produced when this switch is closed. Of course, if desired, the manner in which PLB and REC signals are produced can be reversed.

The operation of the illustrated apparatus can be readily ascertained from the foregoing description; hence, such operation now will be described only briefly. Let it be assumed that a recording operation is selected so that switches 41 through 45 are in their respective REC conditions, and record selecting pushbutton switch 46 is closed. Hence, the reference clock pulses produced by reference oscillator 11 are utilized by clock pulse generator 34 to produce the timing pulses which control memory control circuit 32 and converter 37. The reference clock pulses also are utilized by synchronizing signal generator 33 to generate synchronizing pulses $H_D$ and the vertical sync signal $V_D$.

When switch 46 is closed, standby signal STBY first is produced by mode signal generator 47 to reset converter 37 and memory control circuit 32 to their respective initial conditions. Then, mode signal generator 47 produces record control signal REC which actuates START/STOP signal generator 35 to respond to synchronizing pulses $H_D$ and vertical sync signal $V_D$ to produce the START signal which enables pulse data to be written into and read out of memory 31. Thus, a parallel-bit word supplied to converter 37 by the A/D converters (FIG. 1) is serialized, supplied through switch 41 and written into addressed locations in memory 31 at a first, slower rate. As mentioned previously, the serialized words can be spaced from each other by, for example, two bits, which is sufficient to permit the synchronizing pulse $H_D$ to be inserted therein, as shown in FIG. 2B. The stored pulses subsequently are read out of their storage locations at a second, faster rate; and transmitted through switch 42 and mixer 9 to VTR 1 for recording. Synchronizing pulses $H_D$ are supplied to mixer 9 by synchronizing signal generator 33 for insertion between successive words; and the vertical sync signal produced by the synchronizing signal generator is inserted between adjacent fields. Depending upon the time of occurrence of the read START signal produced by START/STOP signal generator 35, which is a function of the delay imparted to the vertical sync signal $V_D$ by sync signal control circuit 36', pulse data will be read out of memory 31 either 1.0 or 1.5 line intervals following the vertical synchronizing pulses in the odd or even fields, respectively. Thus, pulse encoded audio signals of the type shown in FIGS. 2A-2C are recorded.

When a reproducing operation is selected, switches 41 through 45 are in their respective PLB conditions and record selecting pushbutton switch 46 is opened. Hence, the reference clock pulses produced by reference oscillator 11 no longer are supplied to clock pulse generator 34, nor are the synchronizing pulses $H_D$ and vertical sync signal $V_D$ produced by synchronizing signal generator supplied to START/STOP signal generator 35. The opening of switch 46 actuates mode signal generator 47 to produce the standby signal STBY in synchronism with the vertical sync signal $V_D$ which had been recorded and which is separated from the reproduced signal by synchronizing signal separator circuit 36. Thus, memory control circuit 32 and converter 37 are reset to their initial condition by this STBY signal. When the playback control signal PLB is produced by the mode signal generator, START/STOP signal generator 35 responds to the synchronizing pulses $H_D$ and vertical sync signal $V_D$ separated from the signals reproduced by VTR 1 and supplied thereto from synchronizing signal separator 36 via switch 43 to produce the START signal which enables pulse data to be written into and read out of memory 31. Also, the separated synchronizing pulses $H_D$ are supplied through switch 44 to clock pulse generator 34, whereby the clock pulse generator produces the timing pulses which control converter 37 and memory control circuit 32. Since these timing pulses are synchronized with the synchronizing pulses $H_D$ reproduced by VTR 1, the memory write-in operation performed by the memory control circuit will substantially correct for time-base errors in the reproduced signals.

Accordingly, serialized pulse data reproduced by VTR 1 is supplied to memory 31 via preamplifier 30 and switch 41 and is written into addressed locations therein at the faster rate previously used to read-out and record the pulse data. The pulses now stored in memory 31 are read-out from their storage locations and serially transmitted through switch 42 to converter 37 at the slower rate previously used to write-in pulse data for recording. Since memory control circuit 32 is synchronized with recovered synchronizing pulses $H_D$ and is controlled by the START signal (which is synchronized with recovered vertical sync signal $V_D$), only the pulse encoded audio information reproduced by VTR 1 is stored in memory 31. This serialized pulse data is converted to a parallel-bit word by converter 37 which, in turn, is transformed into an analog audio signal by D/A converters 18L and 18R.

MEMORY AND MEMORY CONTROL

Figure 4A:
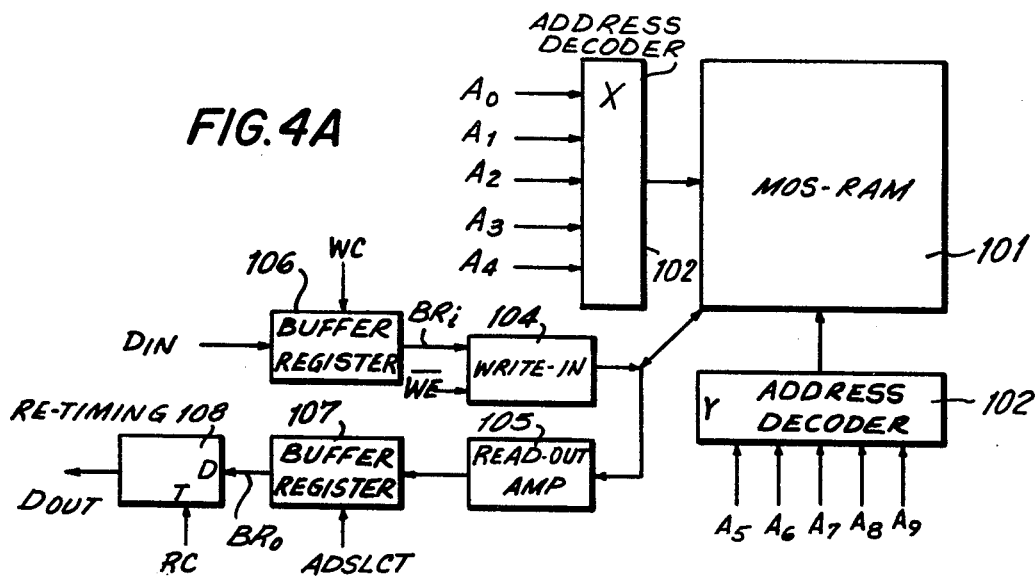
FIGS. 4A and 4B are block diagrams of the memory and memory control apparatus shown in FIG. 3.
Figure 4B:
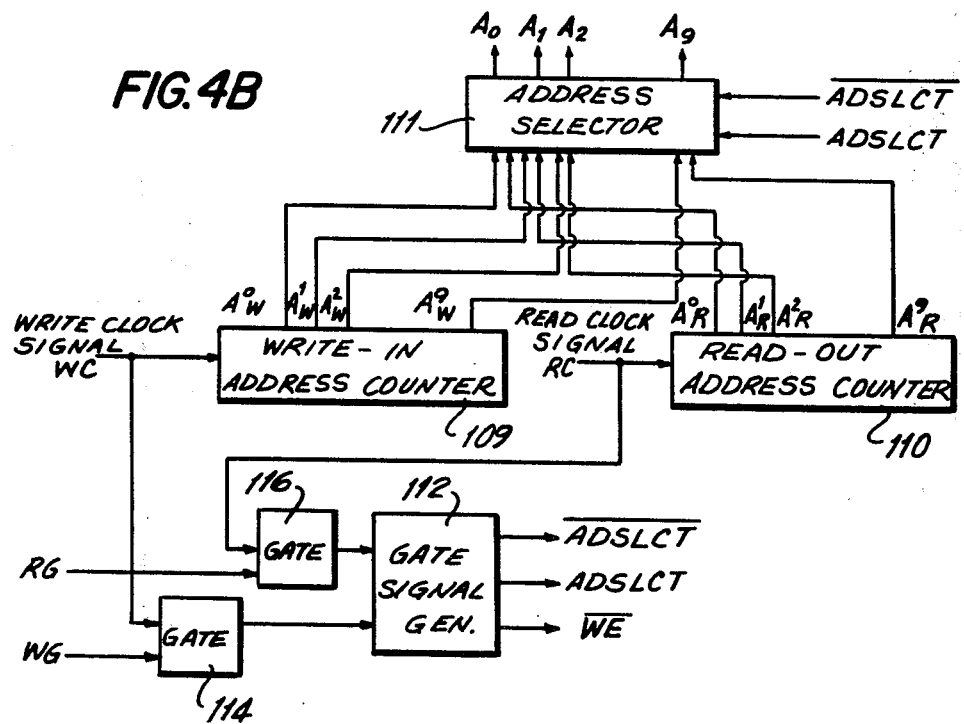

FIGS. 4A and 4B are block diagrams showing memory 31 and memory control circuit 32 (FIG. 3) in greater detail. With reference to FIG. 4A, the memory is illustrated as RAM 101, preferably formed of MOS devices, and having addressable X and Y coordinate locations. That is, a memory location whereat a data bit included in a pulse coded data word is stored is determined by an X coordinate and a Y coordinate. The number of addressable memory locations provided in RAM 101 is equal to its capacity $C_M$ which is equal to the capacity $C_A$ for compressing the time axis of the pulse data during a recording operation (or expanding the time axis during a reproducing operation) plus the capacity $C_B$ for correcting the time-base error that may be present in the reproduced data pulses. That is, $C_M = C_A + C_B$. For time compression, a number of data words first are stored in RAM 101 and then, as other data words are written in, the previously stored words are read out at a faster rate. The delay in reading out these words is equal to $C_A/f_s$, where $f_s$ is the sampling rate, and is determined such that the memory read-out operation for one field of pulse data terminates simultaneously with the write-in operation. Thus, in the waveforms of FIGS. 2A–2C, just after data word #735 is written into RAM 101, it is read out therefrom. The time required to read-out all of the 735 words from RAM 101 is $735/f_t$, while the time required to write all of these words into the RAM is $735/f_s$. Thus, $C_A/f_s + 735/f_t = 735/f_s$. From the numerical parameters and relationships described previously, $C_A = 49$ words $= 1274$ bits.

In a reproducing operation, pulses are written into RAM 101 at a faster rate than the rate at which they are read out. If there is no time-base error, pulse read-out is initiated simultaneously with pulse write-in. However, if there is a time-base error, this can be corrected by delaying the read-out operation by $C_B/2f_t$. The capacity for time-base correction is selected to be $C_B = 12$ words. This means that time-base error or jitter, of greater than 0.2 Hz will be corrected. Therefore, the total capacity $C_M$ of RAM 101 is $C_M = C_A + C_B = 61$ words $= 1586$ bits. Hence, RAM 101 is provided with at least 1586 storage locations. A conventional random access memory that can be used for RAM 101 is a 64 × 64 X–Y addressable array.

RAM 101 is provided with X address leads coupled to an X-address decoder 102 and with Y address leads coupled to a Y-address decoder 103. These decoders are conventional and are adapted to select the proper X and Y addresses of RAM 101 in response to a digital address supplied to each. Although the decoders each are shown to receive a 5-bit address, it is appreciated that 64 addressable X locations are selected by a 6-bit address code, and 64 addressable Y locations also are selected by a 6-bit code. However, for simplification, it is assumed that X-address decoder 102 is provided with address bits $A_0 \ldots A_4$ and that Y-address decoder 103 is provided with address bits $A_5 \ldots A_9$. These address bits are generated by the addressing circuitry shown in FIG. 4B and are used to select write-in and read-out addresses, as will be described.

RAM 101 also is provided with a pulse input terminal coupled to a data write-in channel including a buffer register 106 and write-in gates 104. In addition, RAM 101 includes a pulse output terminal coupled to a read-out channel formed of a read-out amplifier 105, a buffer register 107 and a reclocking, or resynchronizing, circuit 108. For simplification, the pulse input and output terminals of RAM 101 are shown to be a single terminal; however, this need not be the actual construction thereof. Buffer register 106 of the write-in channel is, for example, a two or three bit shift register having an input terminal adapted to receive pulse data $D_{IN}$ supplied by parallel-to-serial converter 37 (FIG. 3) during a recording operation or by preamplifier 30 during a reproducing operation. Buffer register 106 also receives a write clock pulse WC produced by clock pulse generator 34, this pulse being derived during recording from the reference clock pulse produced by reference oscillator 11 and during reproducing from the recovered synchronizing pulses $H_D$. The buffer register thus retimes input pulse data $D_{IN}$ with write clock pulses WC to form resynchronized pulse data $BR_i$ which is supplied to write gates 104. A gating signal $\overline{WE}$ also is supplied to write gates 104 and is adapted to enable the write gate to write a data pulse into an addressed location of RAM 101. Gating signal $\overline{WE}$ is produced by a block shown in FIG. 4B and described in greater detail in copending application Ser. No. 766,746, filed Feb. 8, 1977. In this example, it will be assumed that a data pulse $BR_i$ is written into RAM 101 when gating signal $\overline{WE}$ is relatively negative, or of a low amplitude, corresponding to a binary 0.

In the read-out channel, pulse data supplied to read-out amplifier 105 from the RAM pulse output terminal is supplied to buffer register 107. A gating signal ADSLCT also is supplied to this buffer register and is adapted to enable it to transmit the data pulse that then is received from RAM 101. Hence, buffer register 107 may be formed of a gating circuit adapted to supply read out pulse data $BR_o$. The timing of these read out pulses $BR_o$ is dependent upon that of gating signal ADSLCT and, as will be mentioned in connection with FIG. 4B and described in greater detail in the aforementioned application, is asynchronous. In order to re-time, or resynchronize, pulses $BR_o$, they are supplied to reclocking circuit 108, which may be a timing-pulse controlled flip-flop circuit, such as a D-type flip-flop having a data terminal D supplied with pulse data $BR_o$ and a timing pulse terminal T supplied with read clock pulses RC. These read clock pulses are produced by clock pulse generator 34 and are described in greater detail below with respect to FIG. 5. Reclocking circuit 108 supplies the resynchronized pulse data $D_{OUT}$ to VTR 1 during a recording operation and to serial-to-parallel converter 37 during a reproducing operation.

Although not shown in detail, RAM 101 is adapted to have data written into or read out of an addressed location so long as that address is present for a predetermined minimum time duration, this duaration being a function of the particular memory device which is used. As will now be described with reference to FIG. 4B, a read-out address is present when gating signal ADSLCT is relatively positive, or high, corresponding to a binary 1, and a write-in address is present when complementary gating signal $\overline{ADSLCT}$ is a binary 1 (ADSLCT is a binary 0). These gating signals ADSLCT and $\overline{ADSLCT}$, as well as gating signal WE, are produced by a gate signal generator 112, which is described in greater detail in the aforementioned application Ser. No. 766,746, in response to write clock pulse WC and read clock pulse RC applied via gate circuits 114 and 116, respectively. These gates are selectively enabled by a write gate pulse WG and a read gate pulse RG, respectively, thereby to enable a write-in or a read-out operation, as will be described with reference to FIG. 6 below.

In FIG. 4B, write clock pulses WC are applied to a write-in address counter 109 and read clock pulses RC are applied to a read-out address counter 110, respectively. These counters are similar and may be conventional binary or other digital counters capable of counting the clock pulses applied thereto so as to produce a binary or digital count representing the number of counted pulses. Hence, address counter 109 produces a coded count $A_{1W} \ldots A_{9W}$ representing a write-in address location for RAM 101, while address counter 110 produces a coded count $A_{1R} \ldots A_{9R}$ representing a read-out address location for RAM 101. These addresses are dependent upon the write and read clock pulses, and thus are independent of each other.

The write-in address count $A_{1W} \ldots A_{9W}$ and the read-out address count $A_{1R} \ldots A_{9R}$ are supplied to an address selector 111 which may comprise a gating circuit responsive to complementary gating signals ADSLCT and $\overline{ADSLCT}$ to provide one or the other address count at its output terminals. That is, when gating signal ADSLCT is a binary 1, address selector 111 gates the write-in address count $A_{1W} \ldots A_{9W}$ to its output terminals; whereas when gating signal $\overline{ADSLCT}$ is a binary 1 (ADSLCT is a binary 0), address selector 111 gates the read-out address count $A_{1R} \ldots A_{9R}$ to its output terminals. These address counts are applied to X and Y address decoders 102 and 103, as described previously, to select corresponding write-in and read-out addresses for RAM 101.

The operation of the memory control circuitry shown in FIGS. 4A and 4B is described in detail in the aforementioned application Ser. No. 766,746. However, the following brief description may facilitate an understanding of the present invention. Both during a signal recording and a signal reproducing operation, write clock signals WC and read clock signals RC are applied to counters 109 and 110, respectively, for generating the right-in address count and read-out address count, respectively. Since these clock signals are of different frequencies, the respective counters are incremented at correspondingly different rates. That is, during recording, the read-out address counter is incremented at a faster rate than the write-in address counter. Conversely, during reproducing, the write-in address counter is incremented at a faster rate than the read-out address counter.

Depending upon the conditions of write gate pulse WG and read gate pulse RG, gates 114 and 116, respectively, are selectively conditioned to supply write clock signal WC and read clock signal RC to gate signal generator 112 so that the respective control signals ADSCLT and $\overline{ADSLCT}$ and $\overline{WE}$ are produced. In the absence of these control signals, address selector 111, write-in gates 104 and buffer register 107 effectively are inhibited.

The serialized data words, which are supplied as $D_{IN}$, are synchronized with write clock signals WC in buffer register 106 so as to form resynchronized data words $BR_i$. The first pulse included in a data word is gated by write-in gates 104, which are conditioned by control signal $\overline{WE}$, into the particular addressed location of RAM 101, which then is selected by address selector 111. Similarly, the next pulse included in the data word $BR_i$ is gated in the next address location of RAM 101, which is selected by address selector 111, and so on until the entire data word has been stored. As mentioned previously, if successive data words are spaced from each other by, for example, an interval substantially equal to two pulses, then this spacing also may be written into RAM 101 as respective binary 0's. As an alternative, or if successive data words are not so spaced, then only the 26 information bits of the data word will be written into corresponding address locations in RAM 101.

Subsequently, the data word which had been serially stored in RAM 101 is read out from the respective storage locations therein. As discussed in the aforementioned application Ser. No. 766,746, when the ADSLCT control signal undergoes a transition from a binary 0 to a binary 1, the pulse stored in the location then being addressed by address selector 111 is read out therefrom into buffer register 107. Thus, as address counter 110 advances, respective data pulses are read out from RAM 101. Consistent with the foregoing examples, if the two binary 0's which separate successive data words are stored in RAM 101, then these binary 0's likewise are read out to buffer register 107. Alternatively, if such binary 0's are not written into RAM 101, then, during read-out, address selector 111 may select predetermined locations in RAM 101 following the reading out of a 26-bit data word so as to read out two binary 0's which can be stored in such predetermined locations. In yet another alternative embodiment, buffer register 107 may include a binary counter adapted to count the repetitive occurrences of the ADSLCT control signal. That is, after 26 such occurrences, buffer register 107 may be controlled such that two binary 0's automatically are injected into the data word $BR_o$, and RAM 101 is inhibited from reading out additional pulses during this 2-bit duration. In any event, the serialized data word read out from RAM 101 into buffer register 107 is resynchronized in reclocking circuit 108 with read clock signals RC so as to form the resynchronized data words $D_{OUT}$.

As clearly described in the aforementioned copending application, the write-in and read-out operations are performed independently of each other and substantially simultaneously. For example, a data pulse may be written into a location in RAM 101 followed by the reading out of another pulse, followed by the writing in of a pulse, and so on. Depending upon the relative time of occurrences of the write and read clock signals, two successive data pulses may be written into or read out from RAM 101 before another data pulse is read out or written in, respectively.

Although not shown herein, if desired, gate circuits, similar to gate circuits 114 and 116, may be provided with write gate pulse WG and read gate pulse RG, respectively, to selectively supply the write clock signals WC and read clock signals RC to address counters 109 and 110, respectively.

CLOCK PULSE GENERATOR

Figure 5:
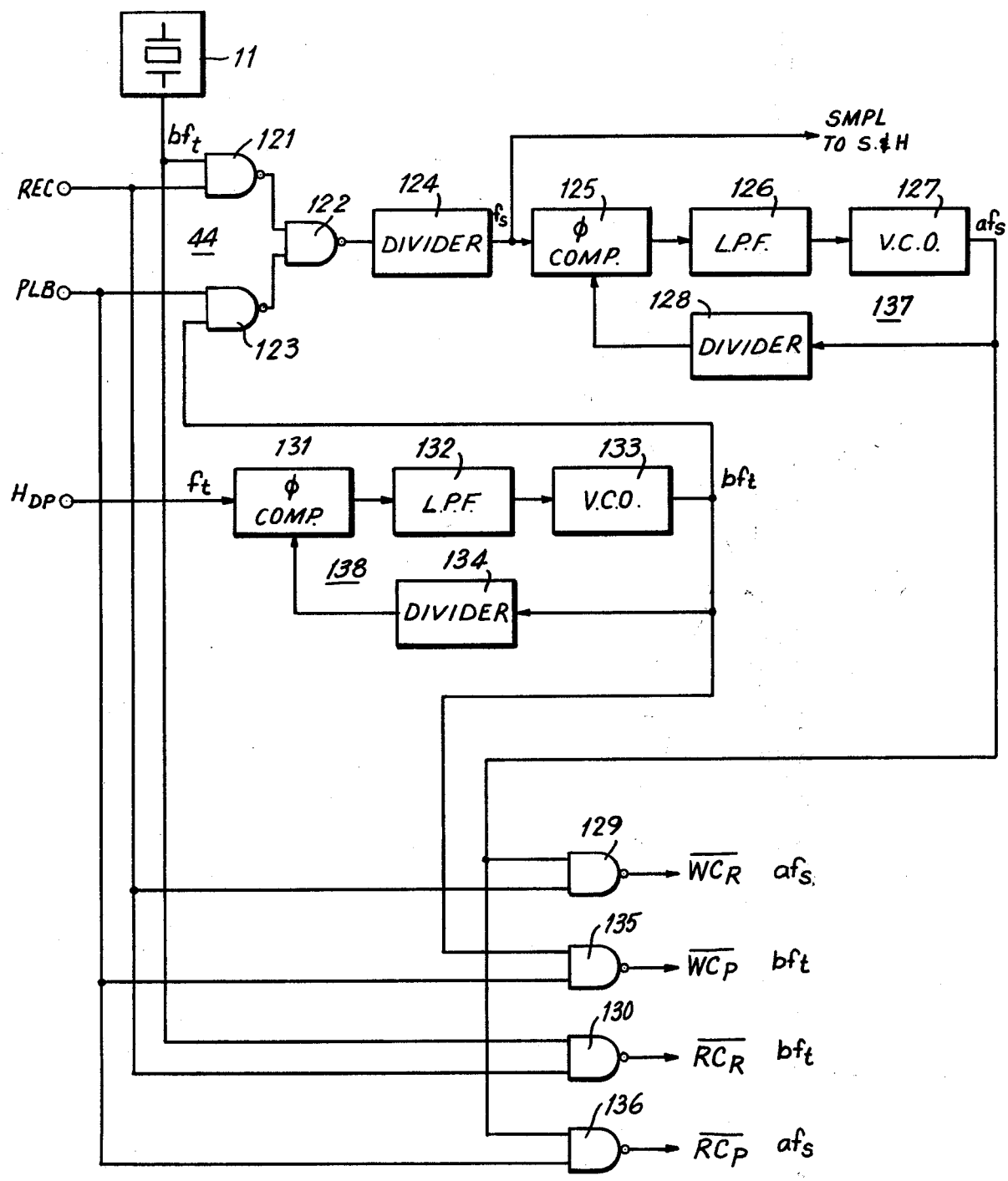
FIG. 5 is a partial logic, partial block diagram of one embodiment of the clock pulse generator shown in FIG. 3.

Clock pulse generator 34 is shown in greater detail in the partial logic, partial block diagram of FIG. 5. The clock pulse generator is comprised of a voltage-controlled oscillator 127 for generating clock pulse signals of a frequency related to the sampling frequency $f_s$. This frequency may be equal to, for example, $af_s$ which is equal to the frequency of the write clock pulses WC during recording, and to the frequency of the read clock pulses RC during reproduction. Also included in the clock pulse generator is a voltage-controlled oscillator 133 which produces timing pulses of a frequency proportional to the word-recording frequency $f_t$. This frequency is, for example, equal to $bf_t$ which is equal to the frequency of the write clock pulses WC during reproduction, and to the frequency of the read clock pulses RC during recording.

Voltage controlled oscillator 127 is included in a phase-locked loop 137 so that the timing pulses produced by the voltage-controlled oscillator are synchronized with the clock pulses produced by reference clock signal generator 11 during a recording operation and with the synchronizing pulses $H_D$ which are reproduced during a reproducing operation. The frequency of the reference clock pulses produced by reference oscillator 11 is, in the illustrated embodiment, greater than the frequency of the timing signals generated by voltage controlled oscillator 127. Accordingly, frequency dividers 124 and 128, respectively, are provided to divide the frequency of the reference clock pulses and the frequency of the timing pulses so that the divided frequencies are equal. It is recalled that the frequencies $f_t$ and $f_s$ are integrally related to each other. Thus, the dividing factors of frequency dividers 124 and 128 can be readily established such that the divided output signals produced thereby are of equal frequencies.

A phase comparator 125, which may be of conventional design, is coupled to the outputs of dividers 124 and 128, respectively, to compare the respective phase of the divided reference clock signals and the divided timing pulses. Any detected error in the phase differential is supplied as a control signal via low-pass filter 126 to voltage controlled oscillator 127 so as to correspondingly adjust the oscillating frequency of oscillator 127 in a direction so as to reduce the phase differential error.

Phase locked loop 138 is similar to phase locked loop 137 and includes a phase comparator 131 to compare the phase of the reproduced synchronizing pulses $H_D$ with the phase of the timing pulses produced by voltage-controlled oscillator 133 so as to derive an error proportional to the phase differential therebetween; this error signal being supplied as a control signal via low-pass filter 132 to adjust the frequency of voltage-controlled oscillator 133 accordingly. The frequency of the timing pulses produced by voltage-controlled oscillator 133 are divided in a frequency divider 134 so as to be equal to the frequency of the reproduced synchronizing pulses $H_D$. Since the frequency of synchronizing pulses $H_D$ is equal to $f_t$, it is appreciated that divider 134 may divide the frequency of the timing pulses produced by voltage-controlled oscillator 133 by the factor b.

It is recalled that, during signal reproduction, a time-base error may be introduced into the pulses because of tape speed fluctuation, tape shrinkage, stretching of tape, etc. This time-base error appears as a phase error in the reproduced pulses. A representation of this error also will be present in the reproduced synchronizing pulses $H_{DP}$. Hereinafter, pulses which are generated or used for a recording operation will be designated with the subscript R, and those which are used or generated during reproducing will be designated with the subscript P. The time-base error in the data pulses can be corrected if such pulses are serially written into the memory by write clock signals WC into which the time-base error has been injected. This is achieved by phase-locking the timing pulses produced by voltage-controlled oscillator 133 with the phase of the reproduced synchronizing pulses $H_{DP}$. For this purpose, it is desirable that low-pass filter 132 exhibit a relatively low time constant so that time-base errors of a higher frequency can be detected and imparted to the timing pulses of frequency $bf_t$.

Although it is theoretically desirable to correct for all time-base errors, even those errors of a very low frequency, such correction would require a storage memory for very high capacity which, correspondingly, is relatively expensive. For example, in order to correct for time-base errors of very low frequency, it may be necessary to store an entire field of data words. This, in turn, would require a memory capacity of almost 20,000 bits. However, since the human ear cannot distinguish such low frequency time-base errors, it is not necessary to correct for them. Consequently, the capacity of the memory storage circuit advantageously can be maintained at an economically reasonable amount. In order to avoid low frequency time-base error correction, the timing pulses produced by voltage-controlled oscillator 127 are phase-synchronized to the timing pulses produced by voltage-controlled oscillator 133 for low frequency time-base errors during signal reproducing.

Accordingly, phase-locked loop 137 is adapted to lock the phase of the timing pulses produced by voltage-controlled oscillator 127 either to the phase of the reference clock pulses produced by reference oscillator 11 or to the phase of the timing pulses produced by voltage-controlled oscillator 133, depending upon whether a recording or reproducing operation is selected. To this effect, a gating circuit formed of NAND gates 121, 122 and 123 is provided, this gating circuit corresponding to switch 44 shown in FIG. 3. NAND gate 121 includes one input coupled to reference oscillator 11 and includes another input adapted to be supplied with a recording enabling signal REC when a recording operation is selected. Similarly, NAND circuit 123 includes one input coupled to voltage-controlled oscillator 133 and another input adapted to receive a reproducing enabling signal PLB when a reproducing operation is selected. The REC and PLB signals are complementary, as will be described below with respect to FIG. 8, so that only one or the other of NAND circuits 121 and 123 is conditioned. NAND circuit 122 transmits either the reference clock pulses gated by NAND gate 121 or the timing pulses gated by NAND gate 123 to phase locked loop 137.

A NAND gate 129 includes one input coupled to voltage-controlled oscillator 127 and another input adapted to receive the REC signal so as to produce the write clock signal WC during a recording operation. More specifically, this NAND gate produces an inverted version of the write clock pulses $\overline{WC_R}$. Similarly, a NAND gate 135 is provided with one input coupled to voltage-controlled oscillator 133 and another input adapted to receive the PLB signal so as to produce write clock pulses $\overline{WC_P}$ during a reproducing operation. Also, a NAND gate 130 is provided with one input coupled to reference oscillator 11 and another input adapted to receive the REC signal so as to produce the read clock signals $\overline{RC_R}$ during a recording operation. Finally, a NAND gate 136 is provided with one input coupled to voltage-controlled oscillator 127 and another input adapted to receive the PLB signal so as to produce the read clock signals $\overline{RC_P}$ during a reproducing operation.

Briefly, the operation of the illustrated clock pulse generator is as follows: During a recording operation, the REC signal is received so as to enable NAND gates 121, 129 and 130. At this time, the PLB signal is not received (i.e., it is a binary 0) so as to inhibit NAND gates 123, 135 and 136 from operating.

The reference clock pulses are transmitted from reference oscillator 11 through conditioned NAND gate 121 and through NAND gate 122 to frequency divider 124. It is appreciated that, because of the binary 0 applied to NAND gate 123 by the PLB signal, NAND gate 123 conditions NAND gate 122 to transmit the reference clock pulses which are applied thereto by NAND gate 121. By suitable frequency division, the frequency of the pulses produced by frequency divider 124 is equal to $f_s$, which is the frequency of the sampling pulses. Hence, the pulse output signal produced by frequency divider 124 is applied as sampling pulses SMPL to sample and hold circuits 5L and 5R for sampling the audio signal which is applied to those circuits. The pulses produced by frequency divider 124 also are compared in phase comparator 125 with the pulses produced by frequency divider 128, these latter pulses having a frequency related to the frequency of the timing pulses generated by voltage-controlled oscillator 127. As mentioned previously, the dividing factors of frequency dividers 124 and 128 are such that the frequencies of the pulses applied to the respective inputs of phase comparator 125 are equal. Any phase differential between these pulses is supplied via low-pass filter 126 as an error signal to control the frequency of voltage-controlled oscillator 127. Thus, the timing pulses produced by the voltage-controlled oscillator are phase-locked, or synchronized, to the reference clock pulses produced by reference oscillator 11. These synchronized timing pulses are transmitted by NAND gate 129, which had been conditioned by the REC signal, as the write clock signal $\overline{WC_R}$, for controlling the writing of data words into RAM 101.

Also, the reference clock pulses produced by reference oscillator 11 are transmitted by NAND gate 130, which had been conditioned in response to the REC signal, as the read clock signals $\overline{RC_R}$ for reading the data words out of RAM 101. Since the frequency of the reference clock pulses is greater than the frequency of the timing pulses generated by voltage-controlled oscillator 127, it is appreciated that the frequency of the read clock signals is greater than the frequency of the write clock signals. Hence, with these respective clock signals, RAM 101 functions to time-compress the data words which are transmitted thereto and stored therein.

During the aforedescribed recording operation, there are, of course, no signals reproduced by VTR 1. Hence, synchronizing pulses $H_{DP}$ are not supplied to phase locked loop 138. However, during a playback operation, these synchronizing pulses are supplied. Furthermore, the PLB signal is provided as a binary 1 while the REC signal is provided as a binary 0, thereby conditioning NAND gates 123, 135 and 136, and inhibiting NAND gates 121, 129 and 130.

Phase locked loop 138 functions in a manner similar to that described hereinabove with respect to phase locked loop 137 such that the timing pulses generated by voltage-controlled oscillator 133 are phase-locked, or synchronized, to the synchronizing pulses $H_{DP}$. Therefore, any time-base error that may appear in synchronizing pulses $H_{DP}$, such as jitter, phase fluctuation or frequency changes, is imparted into the timing pulses generated by voltage-controlled oscillator 133. These timing pulses are transmitted through NAND gate 135 as write clock signals $\overline{WC_P}$ for writing the reproduced data words into RAM 101. Since these write clock signals include any time-base error that may be present in the data words, such data words are written into RAM 101 without timing distortion or errors which might otherwise be produced if the write clock signals had been free of time-base error.

The timing pulses generated by voltage-controlled oscillator 133 also are transmitted through conditioned NAND gate 123 and through NAND gate 122 to frequency divider 124. Thus, these timing pulses, which are synchronized to the reproduced synchronizing pulses $H_{DP}$ are used to phase-lock, or synchronize the timing pulses generated by voltage-controlled oscillator 127. However, as mentioned previously, the time constant of low-pass filter 126 is relatively high. Hence, a time-base error having a relatively high rate of change, which appears as a corresponding change in the error signal produced by phase comparator 125, will not pass through low-pass filter 126, and thus will not be effective to control voltage-controlled oscillator 127. Accordingly, the timing pulses generated by voltage-controlled oscillator 127, which are transmitted by NAND gate 136 as the read clock signals $\overline{RC_P}$ will be free of such rapidly changing time-base error. This, in turn, means that the data words which are read out of RAM 101 will have their time-base error corrected.

However, if the time-base error in the reproduced data words and synchronizing pulses $H_{DP}$ change at a relatively low rate, then the error signal produced by phase comparator 125 also will change at a correspondingly low rate. This slowly varying change is capable of passing through low-pass filter 126 so as to correspondingly change the frequency of the timing pulses generated by voltage-controlled oscillator 127. Thus, for slowly varying time-base errors, the read clock signals $\overline{RC_P}$ will be provided with the same time-base error as the write clock signals $\overline{WC_P}$. This means that the data words now read out of RAM 101 will not have their time-base error corrected. Although this slowly varying time-base error in the data words will be reflected in the recovered audio signals, they are of such a low frequency that they cannot be preceived by the human ear.

As is appreciated, the cut-off range of time-base error correction is determined by the time constant of low-pass filter 126 which, in turn, is established by the capacity of RAM 101.

Since the frequency of the timing pulses generated by voltage-controlled oscillator 127 is less than the frequency of the timing pulses generated by voltage-controlled oscillator 133, the frequency of the read clock signals $\overline{RC_P}$ is less than the frequency of the write clock signals $\overline{WC_P}$ during a playback operation.

START/STOP SIGNAL GENERATOR

Figure 6:
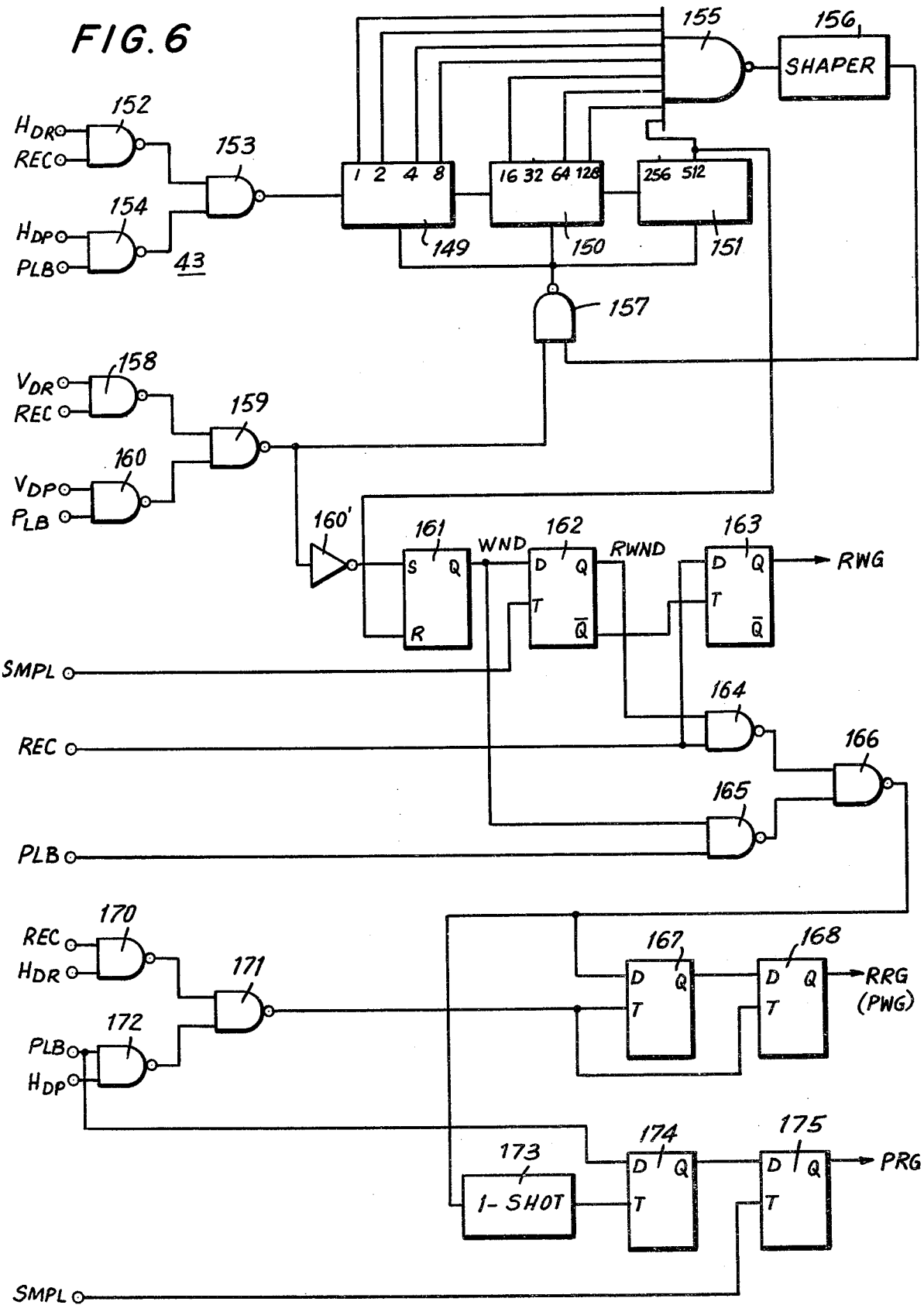
FIG. 6 is a logic diagram of one embodiment of the start/stop signal generator shown in FIG. 3.

Turning now to FIG. 6, there is illustrated a logic diagram of one embodiment of start/stop signal generator 35. The purpose of this signal generator is to generate write gate signals during recording and reproducing so as to enable data words to be written into RAM 101, and to generate read gate pulses during recording and reproducing so as to enable data words to be read out of RAM 101. These respective gate pulses can be applied to the gate circuits shown and described with respect to FIG. 4B for controlling the memory control circuit. The broad purpose of these gate signals is to prevent data words from being read out of RAM 101 during those intervals when vertical sync signals $V_{DR}$ are inserted between fields of data words during recording; and also to prevent data words from being written into RAM 101 during those intervals when a vertical sync signal $V_{DP}$ is received in a reproducing operation.

The foregoing is achieved by a counter circuit formed of, for example, 4-stage counters 149, 150 and 151 connected in sequence and having particular counter output terminals thereof coupled to a NAND gate 155. This counter circuit is adapted to count synchronizing pulses $H_{DR}$ generated during recording as well as synchronizing pulses $H_{DP}$ which are recovered during signal reproduction. The particular counter output terminals which are coupled to NAND gate 155 are such that a binary 1 is produced at each when the count of 735 has been attained. The output of NAND gate 155 is coupled through a pulse shaper 156, which may be a buffer amplifier, to a NAND gate 157. The output of this NAND gate is coupled to all of the reset terminals of counter stages 149, 150 and 151 so as reset these stages to their initial, 0 count.

The respective synchronizing pulses $H_{DR}$ and $H_{DP}$ are supplied to the counter circuit by NAND gates 152, 153 and 154 which correspond to switch 43 (FIG. 3). In particular, NAND gate 152 is adapted to receive the REC signal so as to be conditioned to transmit synchronizing pulses $\overline{H_{DR}}$. Similarly, NAND gate 154 is adapted to receive the PLB signal so as to be conditioned to transmit synchronizing pulses $\overline{H_{DP}}$. The outputs of these NAND gates are coupled to NAND gate 153 which functions as an $\overline{OR}$ circuit for supplying either synchronizing pulses $\overline{H_{DR}}$ or $\overline{H_{DP}}$ to the counter circuit.

The count of the counter circuit additionally is adapted to be reset in response to the vertical sync signal $V_{DR}$ which is generated during a recording operation or the vertical sync signal $V_{DT}$ which is recovered during a signal reproducing operation. For this purpose, NAND gates 158, 159 and 160 are connected in a manner similar to NAND gates 152, 153 and 154, respectively, for selectively transmitting either vertical sync $\overline{V_{DR}}$ or $\overline{V_{DP}}$ either during a recording or reproducing operation. These vertical sync signals appear at the output of NAND gate 159 which, in turn, is coupled to NAND gate 157 for resetting the counter circuit in a manner and for a purpose to be described.

A negative-edge triggered flip-flop circuit 161 is provided for sensing when a field of data words is being recorded (or reproduced) and when the vertical blanking interval is present. For this purpose, the set input of flip-flop circuit 161 is coupled to the output of NAND gate 159 via an inverter 160'. The reset input of this flip-flop circuit is coupled to a particular counter output terminal of counter stage 151. The binary signal provided at this counter output terminal is adapted to change from a binary 0 to a binary 1 after 512 synchronizing pulses $H_D$ have been counted and to change from a binary 1 to a binary 0 when the counter circuit is reset. The Q output of flip-flop circuit 161 produces a window signal WND which is used for generating the respective write gate and read gate signals.

Since a recording operation can be initiated at any time during the rotary movement of the heads of VTR 1, it is preferable to delay the generation of the recording write gate signal WRG until the commencement of a field of data words, as shown in FIG. 2A. This is achieved by providing timing-pulse controlled flip-flop circuits 162 and 163. As a preferred embodiment thereof, these timing-pulse controlled flip-flop circuits are conventional D-type flip-flop circuits and will be described as such. In a D-type flip-flop circuit, the state thereof is determined by the binary sense of the signal applied to its D input at the time that a signal applied to its T input undergoes a positive transition. Thus, if a binary 1 is applied to the D input, a binary 1 will be produced by the Q output in response to this positive transition period. Conversely, if a binary 0 is applied to the D input, a binary 0 will be produced by the Q output in response to a positive transition supplied to the T input.

As shown in FIG. 6, the D input of the D-type flip-flop circuit 162 is coupled to the Q output of flip-flop circuit 161 so as to receive the window signal WND. The T input of D-type flip-flop circuit 162 is adapted to receive the sample signal SMPL produced by the clock pulse generator shown in FIG. 5. Accordingly, the Q output of D-type flip-flop circuit 162 produces a re-timed, or synchronized window signal signal RWND, while the $\overline{Q}$ output of this flip-flop circuit produces a complementary signal. The re-timed window signal RWND is used to generate the recording read gate signal RRG and is supplied through NAND gates 164 and 166 to the D input of another D-type flip-flop circuit 167. NAND circuit 164 is adapted to receive the REC signal so as to be conditioned thereby for transmitting the re-timed window signal RWND.

The $\overline{Q}$ output of D-type flip-flop circuit 162 supplies the complement of the re-timed window signal RWND to the T input of D-type of flip-flop circuit 163, while the D input of this flip-flop circuit receives the REC signal. As will be explained below, D-type flip-flop circuit 163 produces the recording write gate signal RWG at the beginning of the next vertical blanking interval following the initiation of a recording operation, as represented by the commencement of the REC signal.

D-type flip-flop circuit 167 is connected in cascade with another D-type flip-flop circuit 168 for the purpose of producing the recording read gate signal RRG at a time delayed from the vertical synchronizing pulses which are provided in the vertical blanking interval. It is recalled that, in an odd field, the data words are separated from the preceding vertical synchronizing pulses by an amount equal to three times the period of synchronizing pulses $H_D$; while in an even field, the data words are delayed from the vertical synchronizing pulses by an amount equal to 4.5 times the period of synchronizing pulses $H_D$. Sync signal control circuit 36' (FIG. 3) imparts a delay of 1 or 1.5 times the period of synchronizing pulses $H_D$ to the vertical synchronizing signal $V_D$. Hence, the purpose of D-type flip-flop circuits 167 and 168 is to add the additional delay of two times the period of the synchronizing pulses $H_D$. Accordingly, the T inputs of these flip-flop circuits are connected in common to receive synchronizing pulses $H_{DR}$ generated during recording or $H_{DP}$ recovered during reproducing. A gating circuit formed of NAND gates 170, 171 and 172 connected in a manner similar to NAND gates 152, 153 and 154, respectively, are adapted to supply these synchronizing pulses to D-type flip-flop circuits 167 and 168.

During reproducing, it is preferred that the reproducing read gate signal PRG be delayed from the reproducing write gate signal PWG by a number of data word intervals. This will permit a number of data words to be written into RAM 101 before a memory read-out operation commences and, hence, permits the time-base error in such data words to be corrected by this delayed readout. Accordingly, the window signal WND produced by flip-flop circuit 161 is used, during a reproducing operation, to generate the reproducing read gate signal PRG, after a suitable delay. For this purpose, the Q output of flip-flop circuit 161 is coupled to a NAND gate 165 which is adapted to be conditioned in response to the PLB signal. The output of NAND gate 165 is coupled through NAND gate 166 to a monostable multivibrator circuit, or one-shot circuit 173. This one-shot circuit is of the type adapted to be triggered onto its quasi-stable state in response to a positive transition. The output of one-shot circuit 173 normally is a binary 1 when this circuit admits of its stable state and changes to a binary 0 when the circuit admits of its quasi-stable state. The output of one-shot circuit 173 is coupled to the T input of another D-type flip-flop circuit 174. The D input of this flip-flop circuit is supplied with the PLB signal, and its Q output is coupled to a still further D-type flip-flop circuit 175, this latter flip-flop circuit having its T input coupled to receive the sample signal SMPL produced by the clock pulse generator shown in FIG. 5. The Q output of this D-type flip-flop circuit 175 generates the reproducing read gate signal PRG.

Figure 7:
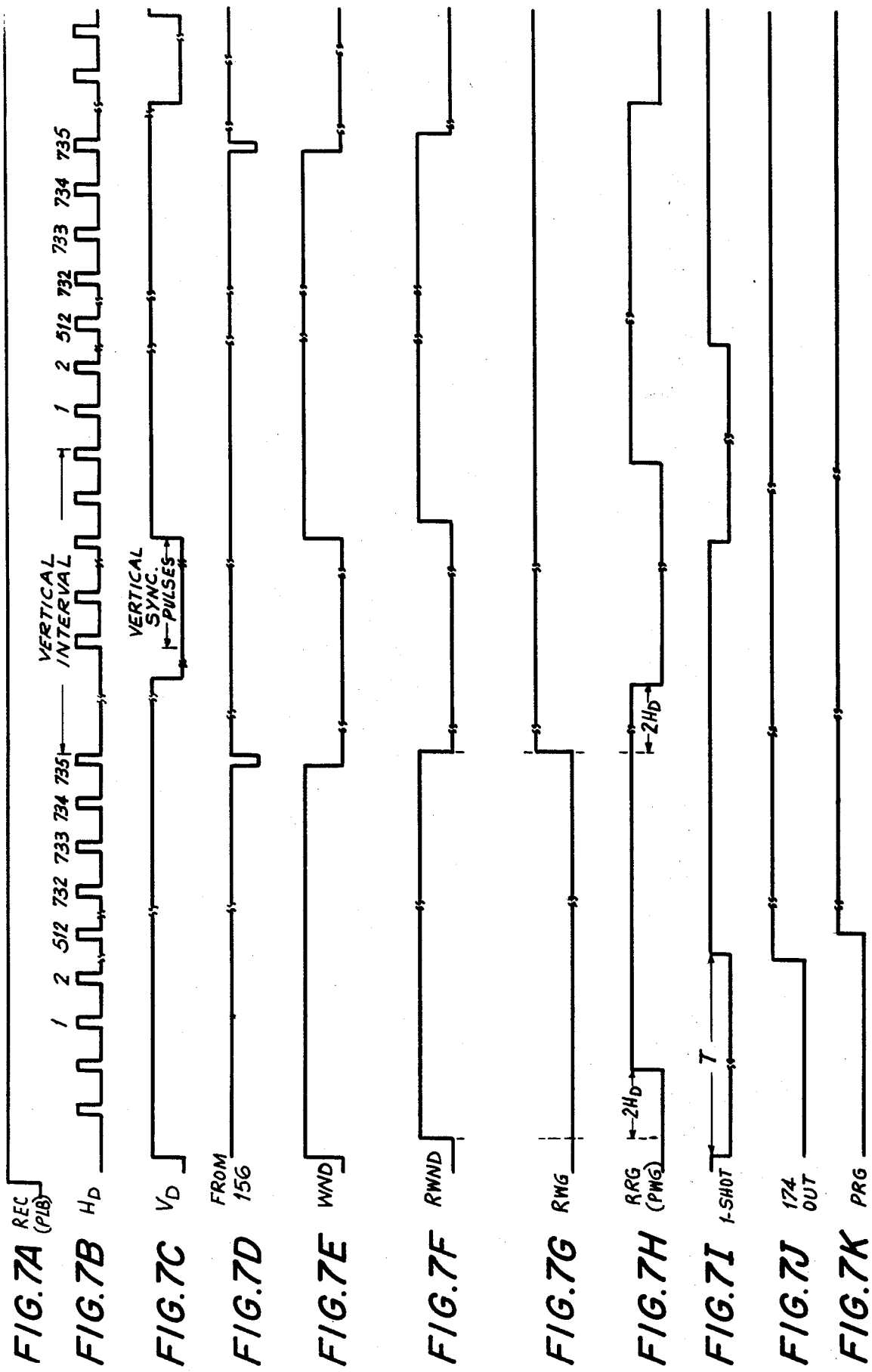
FIGS. 7A-7K are waveform diagrams which are useful in explaining the operation of the start/stop signal generator.

The operation of the start/stop signal generator shown in FIG. 6 now will be described in conjunction with the waveform diagrams shown in FIGS. 7A–7K. Let it be assumed that the recording signal REC or the reproducing signal PLB s generated at some arbitrary time as shown in FIG. 7A. Also, it will be assumed that synchronizing time pulses $H_D$, as shown in FIG. 7B, correspond to the synchronizing pulses $H_{DR}$ generated during a recording operation and $H_{DP}$ recovered during a signal reproducing operation. Consistent with the waveform diagram shown in FIG. 2A, it will be assumed that each synchronizing pulse $H_D$ in FIG. 7B is produced following a data word. These synchronizing pulses are numbered so as to correspond to the particular data word which is recorded or reproduced in each field. FIG. 7B also indicates the vertical blanking interval which separates successive fields of data words. FIG. 7C represents the vertical sync signal which is delayed either by 1.0 or 1.5 times the period of synchronizing pulses $H_D$ by sync signal control circuit 36' (FIG. 3). FIG. 7C also indicates approximately that portion of the vertical blanking interval during which the vertical synchronizing pulses normally are provided.

During a recording operation, the REC signal is a binary 1 so as to condition NAND gates 152, 158, 164 and 170, respectively. Thus, horizontal synchronizing pulses $H_{DR}$ which are generated during recording, are transmitted through NAND gate 152 and through NAND gate 153 to the counter circuit formed of stages 149, 150 and 151. These synchronizing pulses are counted in the counter circuit.

If it is assumed that a vertical sync signal $V_D$ is generated at a time following the commencement of the REC signal, as shown in FIG. 7C, then this vertical sync signal is transmitted through NAND gates 158 and 159 to NAND gate 157 and to inverter 160. This positive transition in the vertical sync signal $V_D$ has no affect upon NAND gate 157, as will become apparent, but is inverted to set flip-flop circuit 161 such that its Q output produces the window signal WND, as shown in FIG. 7E. At the occurrence of the next sample signal SMPL (as produced by the clock pulse generator shown in FIG. 5), D-type flip-flop circuit 162 produces the re-timed window signal RWND shown in FIG. 7F. This re-timed window signal is transmitted through conditioned NAND gate 164 and through NAND gate 166 to D-type flip-flop circuit 167. Accordingly, upon the occurrence of the next synchronizing pulse $H_D$, flip-flop circuit 167 is set to supply D-type flip-flop circuit 168 with a binary 1. Then, at the occurrence of the next synchronizing pulse $H_D$, flip-flop circuit 168 is set to produce the recording read gate signal RRG, as shown in FIG. 7H. It is appreciated that this recording read gate signal is delayed by a period $2H_D$ equal to two times the period of the synchronizing pulses so that the recording read gate signal commences at a suitable time delayed from the completion of the vertical synchronizing pulses provided during the vertical blanking interval. When this delay $2H_D$ is added to the delay imparted by sync signal control circuit 36', it is appreciated that the recording read gate signal RRG is generated at a time following the completion of the vertical synchronizing pulses equal either to three times the period of synchronizing pulses $H_D$ or 4.5 times the period of synchronizing pulses $H_D$, depending upon whether data words in an odd field or an even field are to be read out from RAM 101 and recorded by VTR 1.

Returning to the counter circuit formed of stages 149, 150, and 151, this circuit continues to count synchronizing pulses $H_D$ until the count of 735 is reached. It is appreciated that the 735th synchronizing pulse $H_D$ represents the end of recording useful data words and the beginning of the vertical blanking interval. This count is detected by NAND gate 155 to produce a negative-going pulse which, in turn, is shaped by shaping circuit 156 (FIG. 7D) and applied to NAND gate 157 to reset all of the counter stages to an initial, O count. When the counter stages are reset, count 512 output terminal undergoes a negative transition so as to reset flip-flop circuit 161 and thereby terminate window signal WND, as shown in FIG. 7E. At the next sample signal SMPL, the re-timed window signal RWND also is terminated (FIG. 7F). Now, at this time, the complement of the re-timed window signal produced by the $\overline{Q}$ output of flip-flop circuit 162 undergoes a positive transition so as to set flip-flop circuit 163 which then is receiving the REC signal. Consequently, flip-flop circuit 163 produces the recording write gate signal RWG shown in IFG. 7G. Once set, flip-flop circuit 163 remains in this condition for the duration of a recording operation, that is, until the REC signal returns to a binary 0. Thus, it is seen that data words are not written into RAM 101 until after the completion of the first field of data words following the initiation of a recording operation. This has the effect of minimizing errors and avoiding the storage of data words which may be generated during only a portion of a field.

When flip-flop circuit 162 is reset, the negative transition in the re-timed window signal RWND is transmitted through NAND gates 164 and 166 so as to reset flip-flop circuit 167 upon the occurrence of the next synchronizing pulse $H_D$. Then, at the occurrence of the next following synchronizing pulse $H_D$, flip-flop circuit 168 is reset so as to terminate the recording read gate signal RRG, as shown in FIG. 7H. Thus, the negative transition in the recording read gate signal is delayed from the negative transition in the re-timed window signal by $2H_D$, that is, the time equal to two times the period of the synchronizing pulses $H_D$.

During the vertical blanking interval, the various synchronizing pulses, equalizing pulses and vertical synchronizing signals are counted by stages 149, 150 and 151. However, it is appreciated that this count does not represent the number of data words which are being stored in or read out of RAM 101. Accordingly, upon the completion of the vertical blanking interval, that is, when vertical sync signal $V_D$ undergoes a positive transition, NAND gate 157 is actuated to reset counter stages 149, 150 and 151 to their initial, zero counts. The counter circuit then operates in the aforedescribed manner until the 735th synchronizing pulse $H_D$ is counted.

The positive transition in vertical sync signal $V_D$ also sets flip-flop circuit 161 to produce the window signal WND, as shown in FIG. 7E. As described previously, the re-timed window signal RWND (FIG. 7F) is generated and its complement is used to trigger flip-flop circuits 167 and 168 for generating the recording read gate signal RRG, as shown in FIG. 7H. Accordingly, the recording read gate signal RRG is coincident with the duration that data words are to be recorded during both even and odd fields, as represented in FIG. 2A. This enables the data words which are stored in RAM 101 to be read out therefrom and recorded by VTR 1. Also, the duration that the recording read gate signal RRG is a binary 0 corresponds to the vertical blanking interval shown in FIG. 2A during both even and odd fields. Hence, the recording read gate signal prevents data words from being read out of RAM 101 during such vertical blanking intervals. This prevents a loss of data due to the insertion or superposition of the vertical sync signal during recording.

During reproduction, the REC signal is a binary 0 and the PLB signal is a binary 1, such as shown in FIG. 7A. Accordingly, during reproduction, NAND gates 154, 160, 165 and 172 are conditioned.

The operation of the counter circuit during reproduction is substantially the same as that during recording, except that the synchronizing pulses $H_{DP}$ which are counted are the synchronizing pulses which are separated by synchronizing signal separator 36 from the reproduced composite data signal. Similarly, flip-flop circuits 161 and 162 operate in substantially the same manner during both recording and reproduction, except that flip-flop circuit 161 is set in response to the vertical sync signal $V_{DP}$ which is separated by synchronizing signal separator 36 from the reproduced composite data signal. Flip-flop circuit 163 remains in its reset condition, that is, recording write gate signal RWG is maintained as a binary 0, because the REC signal now is a binary 0.

The window signal WND produced by flip-flop circuit 161 (FIG. 7E) is transmitted by conditioned NAND gate 165 through NAND gate 166 to the D input of flip-flop circuit 167 and to one-shot circuit 173. Flip-flop circuits 167 and 168 operate in the manner described hereinabove with respect to a recording operation so as to produce a reproducing write gate signal PWG which is seen to be identical to the aforedescribed recording read gate signal RRG, shown in FIG. 7H. Since, during a reproducing operation, the sample signals SMPL are not used, it is not necessary to use the re-timed window signal RWND to trigger flip-flop circuit 167. As shown in FIG. 7H, the reproducing write gate signal PWG is delayed by $2H_D$, that is, the time equal to two times the period of synchronizing pulses $H_D$, so that only useful data words in each field are written into RAM 101. With respect to FIG. 2A, this delay in the reproducing write gate signal enables the first useful data word in either the even field or the odd field to be written into the memory circuit. Hence, no portion of the vertical blanking interval need be stored. This reduces the appearance of noise in the ultimately reproduced audio signal.

One-shot circuit 173 is triggered into its quasi-stable state in response to the positive transition in window signal WND. Hence, the output of this one-shot circuit undergoes a negative transition and remains as a binary 0 for a period T. At the conclusion of this period, the output of the one-shot circuit returns to a binary 1 so as to trigger flip-flop circuit 174 to the state represented by the PLB signal which is applied to its D input. The output of flip-flop circuit 174 (FIG. 7J) is applied to flip-flop circuit 175 which, in response to the next sample signal SMPL, is triggered to produce the reproducing read gate signal PRG, shown in FIG. 7K. Since the PLB signal is maintained as a binary 1 throughout the entire reproducing operation, both flip-flop circuits 174 and 175 remain in their respective set states, and the reproducing read gate signal PRG is a substantially continuous binary 1, as shown.

The continued operation of the illustrated apparatus is substantially similar as that described hereinabove. Thus, when the counter circuit is reset to its initial count, the window signal WND undergoes a negative transition and, at a time delayed therefrom by $2H_D$, the reproducing write gate signal PWG also undergoes a negative transition, as shown in FIG. 7H. Following the resetting of the counter circuit, when the vertical sync signal $V_D$ undergoes a positive transition (FIG. 7C), the window signal WND likewise undergoes a positive transition (FIG. 7A) and, subsequently, the reproducing write gate signal PWG also undergoes a positive transition (FIG. 7H).

Thus, it is seen that the reproducing write gate signal PWG enables only the useful data words which are reproduced by VTR 1 to be written into RAM 101. The reproducing write gate signal PWG is a binary 0 during the actual vertical blanking interval and, therefore, inhibits any portion of this vertical blanking interval from being written into the memory circuit.

MODE SIGNAL GENERATOR

Figure 8:
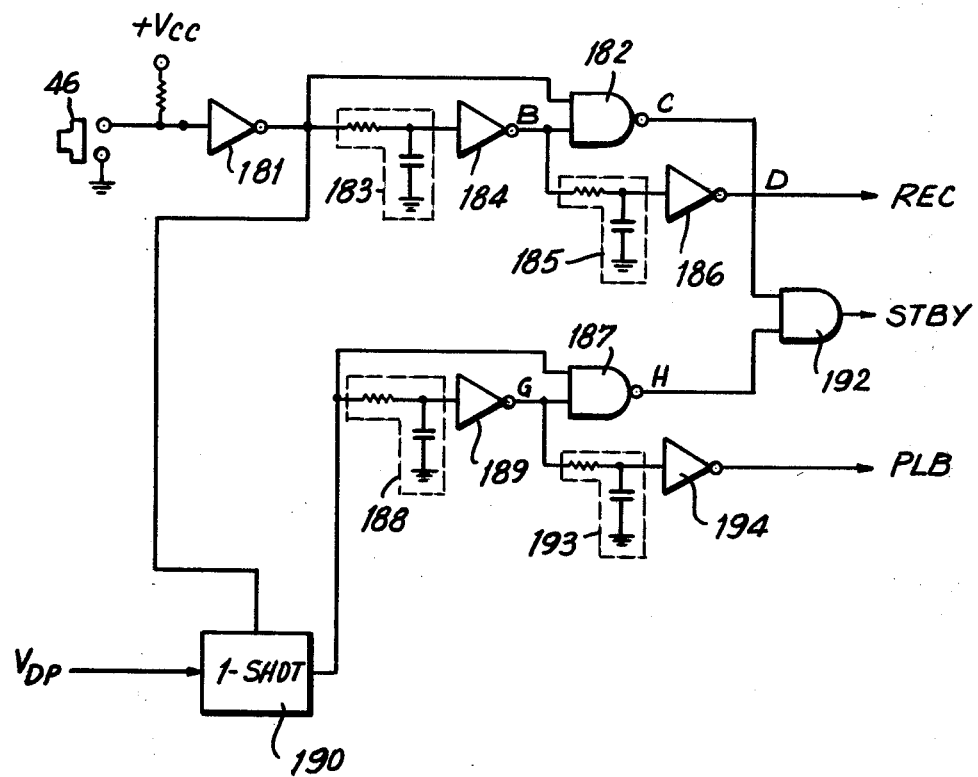
FIG. 8 is a logic diagram of the mode signal generator shown in FIG. 3.

Mode signal generator 47 is shown in greater detail in the logic diagram illustrated in FIG. 8. As mentioned previously, the purpose of this mode signal generator is to produce the recording signal REC, the playback signal PLB and the standby signal STBY at suitable times and in response to the actuation of switch 46. Accordingly, the mode signal generator is comprised of an inverter circuit 181 coupled to switch 46 to receive a corresponding logic signal depending upon whether the switch has been closed to initiate a recording operation or opened for a reproducing operation. A source of potential $+V_{cc}$ is coupled through a resistor to the input of inverter circuit 181 and is selectively coupled to ground when switch 46 is closed. The output of this inverter circuit is coupled directly to one input of a NAND gate 182 and through a delay circuit 183 in cascade with an inverter circuit 184 to another input of NAND gate 182. The output of inverter circuit 181 is further coupled to an enabling input of a monostable multivibrator circuit 190, hereinafter referred to as one-shot circuit. This one-shot circuit is conventional and is of the type that is inhibited from being triggered to its quasi-stable state in response to a triggering input signal, such as vertical synchronizing signals $V_D$, in the event that a binary 1 is applied to its inhibit input. Conversely, if a binary 0 is applied to the inhibit input of one-shot circuit 190, this circuit is conditioned to be triggered to its quasi-stable state.

The output of inverter circuit 184 is coupled to an inverter circuit 186 through a delay circuit 185. The signal produced by inverter circuit 186 is the recording signal REC, as will be described below.

One-shot circuit 190 normally admits of its stable state and produces a binary 1 representative thereof. The output of this one-shot circuit is coupled directly to one input of a NAND gate 187 and is further coupled through a delay circuit 188 and an inverter circuit 189 to another input of NAND gate 187. The outputs of NAND gates 182 and 187 are connected to respective inputs of an AND gate 192. As will be described below, this AND gate produces the standby signal STBY.

The output of inverter circuit 199 additionally is connected to another inverter circuit 194 through a delay circuit 193 so as to produce the playback signal PLB.

The manner in which the illustrated mode signal generator operates now will be described in conjunction with the explanatory waveform diagrams shown in FIGS. 9A–9J. Initially, let it be assumed that a recording operation is selected. Accordingly, switch 46 is closed to supply a binary 0 to inverter 181, as shown in FIG. 9A. Prior to the closing of this switch, a binary 1 had been applied to the inverter circuit resulting in a binary 0 applied to inverter circuit 184 which, in turn, produced a binary 1 as represented by signal B, shown in FIG. 9B. Accordingly, when switch 46 first is closed, a binary 1 is applied to NAND gate 182 by inverter circuit 181, and the binary 0 which previously had been applied to inverter circuit 184 is maintained for a period determined by delay circuit 183. Thus, for this period, NAND gate 182 is supplied with a binary 1 at each input thereof, thereby producing a binary 0, as represented by signal C shown in FIG. 9C. The negative-going pulse signal C is applied to AND gate 192, resulting in the standby signal STBY shown in FIG. 9J at the output thereof.

At the conclusion of the time delay established by delay circuit 183, signal B changes to a binary 0, thereby actuating NAND gate 182 to produce a binary 1, as represented by signal C shown in FIG. 9C. This terminates the standby STBY of FIG. 9J.

After another delay determined by delay circuit 185, the signal B is applied as a binary 0 to inverter circuit 186, resulting in the positive-going recording signal REC shown in FIG. 9D. This recording signal REC is terminated when switch 46 is opened. This is because the opening of switch 46 applies a binary 1 to inverter circuit 181 which is inverted to a binary 0 and, after being delayed in delay circuit 183, results in a binary 1 at the output of inverter circuit 184. After a further delay in delay circuit 185, the binary 1 (signal B shown in FIG. 9B) is inverted by inverter circuit 186 to terminate the recording signal REC, as illustrated in FIG. 9D.

Thus, prior to the initiation of recording signal REC, a negative-going standby signal STBY is produced and is supplied to memory control circuit 32 (FIG. 3) to clear, or erase the contents of memory circuit 31. Thus, any residual data words that might have been present in the memory circuit are erased therefrom immediately prior to the start of a recording operation. This insures that erroneous data will not be read out of the memory circuit and recorded by VTR 1.

A reproducing operation is established by opening switch 46 and by receiving the first vertical sync signal $V_{DP}$ from VTR 1 after being separated by synchronizing signal separator 36 from the reproduced composite data signal. As will be understood, although VTR 1 operates to reproduce this composite signal, the reproduced signal will not be stored in memory circuit 31 until switch 46 is opened and a vertical sync signal is detected.

When switch 46 is opened, inverter circuit 181 applies a binary 0 to one-shot circuit 190 so as to enable that one-shot circuit to respond to the vertical sync signal $V_{DP}$. Upon receiving the first such vertical sync signal, as shown in FIG. 9E, one-shot circuit 190 is triggered to its quasi-stable state. This one-shot circuit is retriggerable and exhibits a time constant which is greater than the period between successive vertical sync signals. Hence, the one-shot circuit is retriggered in response to each vertical sync signal, thereby maintaining its quasi-stable state, as shown in FIG. 9F.

After a suitable delay imparted by delay circuit 188, inverter circuit 189 receives the binary 1 generated by one-shot circuit 190, and inverts this binary 1 to a binary 0 as shown in FIG. 9G. During the delayed interval that one-shot circuit 190 produces a binary 1 but inverter circuit 189 has not yet responded to this binary 1, NAND gate 187 is supplied with a binary 1 at each input thereof. Hence, this NAND gate produces a negative-going pulse H which is applied through AND gate 192 as the standby signal STBY shown in FIG. 9J. Pulse H and standby signal STBY terminate when inverter circuit 189 produces a binary 0 shown in FIG. 9G.

After another delay determined by delay circuit 193, the binary 0 produces by inverter circuit 189 is inverted to a binary 1 by inverter circuit 194, thereby producing the reproducing signal PLB shown in FIG. 9I. Accordingly, when a reproducing operation is initiated, the standby signal STBY first is produced (FIG. 9J) followed by the reproducing signal PLB (FIG. 9I). As was mentioned with respect to the recording operation, this standby signal is applied to memory control circuit 32 so as to clear, or erase the contents of memory circuit 31. Consequently, any residual data words might have otherwise remained in the memory circuit prior to a reproducing operation will not be read out therefrom. This insures that the reproduced audio signal will not be deleteriously affected by any remanent data.

It is appreciated that the recording signal REC and the reproducing signal PLB produced by the mode signal generator illustrated in FIG. 8 are applied to the clock pulse generator shown in FIG. 5 and to the start/stop signal generator shown in FIG. 6 for the purpose described previously with respect to these figures.

While the present invention has been particularly shown and described with respect to a preferred embodiment thereof, it will be readily apparent to one of ordinary skill in the art that various changes and modifications in form and details may be made without departing from the spirit and scope of the invention. For example, although it has been assumed that the information represented by the pulse signals which are recorded and reproduced by VTR 1 is audio information, any other type of useful information can be represented by such pulse signals. Furthermore, the video signal recorder with which the present invention can be used need not be limited solely to a VTR. It is contemplated that other types of video signal recorders can be used with this invention. Still further, the particular number of bits comprising each data word and the number of data words included in a field need not be limited solely to the example described herein.

Therefore, it is intended that the appended claims be interpreted as including the foregoing as well as all other such changes and modifications.

What is claimed is:

1. A method of recording pulse encoded information in the form of successive plural-bit words on a record medium by a video signal recorder of the type normally adapted to record video signals, such as composite television signals, on said record medium and normally having a control mechanism that is responsive to the synchronizing signals contained in said video signals for controlling the recording operation thereof, said method comprising the steps of supplying successive ones of said plural-bit words, generating simulated horizontal and vertical synchronizing signals synchronized to the frequencies of the horizontal and vertical synchronizing signals normally included in said video signals; time-compressing each of said plural-bit words by writing said words into an addressable memory at a first rate and contemporaneously reading said words out of said memory at a second, faster rate to insert relatively short gaps between adjacent read-out words and to insert a relatively large gap between adjacent fields of words, combining the simulated horizontal and vertical synchronizing signals with said plural bit words without loss of any of such words by inserting a simulated horizontal synchronizing signal into each gap between adjacent words and by inserting a simulated vertical synchronizing signal into the large gap between adjacent fields to form a substantially continuous pulse signal; and recording fields of the substantially continuous pulse signal formed of said combined synchronizing signals and plural-bit words in successive tracks on said record medium, a field of words being recorded during the time normally required for recording a video field, so as to record all of said supplied plural-bit words.

2. The method of claim 1 wherein said step of recording comprises recording said substantially continuous pulse signal in said tracks in serial form.

3. The method of claim 2 wherein said simulated vertical synchronizing signals are of the same frequency as the vertical synchronizing signals normally included in said video signals.

4. The method of claim 3 wherein said simulated horizontal synchronizing signals are of a frequency that is a multiple of the frequency of the horizontal synchronizing signals normally included in said video signals.

5. The method of claim 1 wherein said words are written into addressable locations of said memory serially by bit, and contemporaneously read out of said addressable locations serially by bit at a time delayed with respect to the writing of said words so as to form said relatively large gap between adjacent fields of read-out words.

6. The method of claim 1 wherein each of said plural-bit words represents a sample of audio information; and said step of supplying said plural-bit words comprises supplying analog audio signals, and converting said analog signals to digital form.

7. The method of claim 7 wherein said step of converting said analog audio signals to digital form comprises periodically sampling said analog audio signal, converting each sample to a plural-bit word, and serializing said plural-bit words into a train of bits having said first rate.

8. A method of reproducing substantially continuous plural-bit words in succession from a record medium by video signal playback apparatus of the type normally adapted to play back video signals, such as composite television signals, from successive tracks in said record medium and normally having a control mechanism that is responsive to the synchronizing signals contained in the played back video signals for controlling the playback operation, the plural-bit data words being recorded with simulated horizontal synchronizing signals interleaved between adjacent words and with simulated vertical synchronizing signals interleaved between adjacent fields of words, the simulated horizontal and vertical synchronizing signals being synchronized to the frequencies of the horizontal and vertical synchronizing signals normally included in said video signals, said method comprising the steps of reproducing a field of said plural-bit words and interleaved simulated horizontal and vertical synchronizing signals from said record medium in the time normally required to reproduce a video field; separating said reproduced simulated horizontal and vertical synchronizing signals from said plural-bit words to form relatively short gaps between adjacent words and a relatively large gap between adjacent fields of words; and recovering the data represented by said reproduced plural-bit words by time-expanding said words, including the steps of writing each of said words into an addressable memory at a first rate and contemporaneously reading said words out of said memory at a second, slower rate to fill in said short and large gaps, thereby producing substantially continuous, successive read-out plural-bit words.

9. The method of claim 8 wherein said step of reproducing comprises serially reproducing said plural bits and said simulated synchronizing signals to derive a substantially continuous bit train having said first rate.

10. The method of claim 9 wherein said plural-bit words represent audio information, and said step of recovering the data represented by said words comprises converting each word into a corresponding analog signal level.

11. The method of claim 9 wherein said step of time-expanding comprises generating write clock pulses synchronized to said simulated horizontal synchronizing signals separated from said reproduced signals; writing said serially reproduced bits into addressable locations of a memory storage at a write-in rate determined by said generated write clock pulses; generating read clock pulses at a slower repetition rate than that of said write clock pulses including the steps of comparing the phase of said read clock pulses with the phase of said write clock pulses, and varying the phase of said read clock pulses to be equal to that of said write clock pulses only if the phase differential therebetween changes at a rate slower than a predetermined threshold; and reading said encoded data pulses out of said addressable locations of said memory storage at the read clock pulse rate.

12. The method of claim 11 wherein said simulated vertical synchronizing signals are of the same frequency as the vertical synchronizing signals normally included in said video signals, and said simulated horizontal synchronizing signals are of a frequency that is a multiple of the frequency of the horizontal synchronizing signals normally included in said video signals.

13. A system for recording pulse data on a record medium, comprising:

means for supplying said pulse data in the form of successive, serialized plural-bit words;

synchronizing signal generator means for generating simulated video horizontal and vertical synchronizing pulses;

time-compression means for receiving each of said serialized plural-bit words, in succession, said time-compression means including memory means having addressable locations into which said plural-bit words are written at a first rate and from which said words are contemporaneously read at a second, faster rate for compressing the time domain of said plural-bit words to insert relatively small gaps between adjacent read-out words;

means for delaying the contemporaneous reading out of said plural-bit words with respect to the writing in thereof so as to insert a relatively large gap between adjacent fields of said read-out words;

mixing means for mixing said simulated synchronizing pulses with said read-out words without loss of any of said words such that said simulated horizontal synchronizing pulses are interleaved into said relatively small gaps between adjacent words and said simulated vertical synchronizing pulses are interleaved into said relatively large gaps between adjacent fields of words; and means for recording each of said plural-bit words and interleaved synchronizing pulses serially in successive record tracks on said record medium.

14. The system of claim 13 further comprising clock pulse generating means for generating write-in clock pulses at said first rate, and read-out clock pulses at said second, faster rate for the writing-in and reading-out, respectively, of said data words.

15. The system of claim 14 wherein said clock pulse generating means comprises a source of timing pulses having said second rate for producing said read-out clock pulses, controllable oscillator means for producing said write-in clock pulses; and control means for controlling said oscillator means with said read-out clock pulses so as to synchronize said write-in and read-out clock pulses at a fixed ratio with respect to each other.

16. The system of claim 14 wherein said means for supplying said plural-bit words comprises a source of audio analog signals; analog-to-digital converting means for sampling said analog signals and for converting each analog signal sample into a corresponding word formed of encoded bits; and means for supplying said bits serially to said memory means.

17. The system of claim 16 wherein said time-compression means further includes gate signal generator means for generating a write-in gate signal to enable said serially supplied bits to be written into said memory means and for generating a read-out gate signal to enable said bits to be read out serially of said memory means during selected intervals.

18. The system of claim 7 wherein said gate signal generator means comprises counter means for receiving and counting said simulated horizontal synchronizing signals and for generating an output signal after a predetermined number of simulated horizontal synchronizing signals corresponding to a field of plural-bit words have been counted; detecting means for detecting the termination of a simulated vertical synchronizing signal; and means for commencing said read-out gate signal when the termination of said simulated vertical synchronizing signal is detected and for terminating said read-out gate signal when said output signal is generated.

19. The system of claim 18, further comprising actuable switch means for initiating a recording operation; and wherein said gate signal generator means further comprises means responsive to said output signal generated after said switch means first is actuated for producing said write-in gate signal.

20. A system for reproducing pulse data which had been recorded in successive record tracks on a record medium, said recorded pulse data being formed of successive plural-bit words with adjacent words separated from each other by simulated horizontal synchronizing signals, said words forming a field with successive fields separated from each other by simulated vertical synchronizing signals, said system comprising:

signal playback means for reproducing said plural-bit words serially by bit and said simulated horizontal and vertical synchronizing signals in a substantially continuous composite signal;

synchronizing signal separator means for receiving said composite signal and for separating said simulated horizontal and vertical synchronizing signals therefrom to form relatively short gaps between adjacent words and a relatively large gap between adjacent field of words;

data recovery means for receiving said reproduced plural-bit words and for recovering the data represented thereby, said data recovery means including time domain expanding means comprising memory means having addressable locations into which said reproduced plural-bit words are written at a first rate and from which said words are contemporaneously read at a second, slower rate for expanding the time domain of said plural-bit words to fill in said short and large gaps and form substantially continuous, successive serial by bit words; and timing means coupled to said synchronizing signal separator means for controlling the writing in and reading out of plural-bit words in said memory means in response to said separated simulated horizontal and vertical synchronizing signals.

21. The system of claim 20 wherein said timing means comprises a first controllable oscillator for generating first timing pulses at said first rate which is a multiple of the frequency of said simulated horizontal synchronizing signals; first phase control means for controlling the phase of said first timing pulses to be equal to the phase of said separated horizontal synchronizing signals, whereby if a time-base error is present in the reproduced composite signal, it is imparted to said first timing pulses; a second controllable oscillator for generating second timing pulses at said second rate; second phase control means for controlling the phase of said second timing pulses to be equal to the phase of said first timing pulses only if the phase differential therebetween varies at a rate which is less than a predetermined rate; and means for applying said first and second timing pulses to said memory means as write-in and read-out timing pulses, respectively; whereby time-base errors that are greater than said predetermined rate are corrected by writing said plural-bit words into said memory means in response to said phase-controlled first timing pulses and reading said data words out of said temporary storage means in response to said second timing pulses, and time-base errors that are less than said predetermined rate are not corrected.

22. The system of claim 20 wherein said timing means comprises counter means for counting said separated simulated horizontal synchronizing signals until a predetermined count corresponding to a field of plural-bit words is obtained; detecting means for detecting each separated simulated vertical synchronizing signals, and gate pulse generating means responsive to the predetermined count of said counter means and to said detecting means for generating a write-enabling gate pulse having an enabling portion extending from the termination of a detected simulated vertical synchronizing signal until said predetermined count is obtained and an inhibiting portion extending from the time said predetermined count is obtained until the termination of a detected simulated vertical synchronizing signal; said enabling portion enabling said plural-bit words to be written serially into said memory means.

23. The system of claim 22 wherein said timing means further comprises actuable switch means for initiating a playback operation; means for detecting the start of the first field of reproduced plural-bit words following actuation of said switch means; and means for generating a read-enabling signal at a time delayed from said detected start of the first field, the read-enabling signal overlapping in time with said write-enabling gate pulse to enable said plural-bit words to be written into and then read out of said memory means contemporaneously.

24. The system of claim 20 wherein said recorded plural-bit words represent samples of audio information, and said data recovery means further includes digital-to-analog converting means for converting the substantially continuous, successive serial by bit words into analog audio signals.

25. The system of claim 24 wherein said digital-to-analog converting means comprises a serial-to-parallel converter for converting said serial bits into parallel data words; means for producing an analog signal level corresponding to each data word; and filter means for filtering successively produced analog signal levels.

* * * * *